US007937298B2

(12) United States Patent
Shah

(10) Patent No.: US 7,937,298 B2
(45) Date of Patent: May 3, 2011

(54) GUARANTEED RFID EVENT DELIVERY

(75) Inventor: Harshal H. Shah, Fremont, CA (US)

(73) Assignee: Oracle International Corporation, Redwood Shores, CA (US)

( * ) Notice: Subject to any disclaimer, the term of this patent is extended or adjusted under 35 U.S.C. 154(b) by 87 days.

(21) Appl. No.: 11/749,879

(22) Filed: May 17, 2007

(65) Prior Publication Data
US 2008/0284569 A1 Nov. 20, 2008

(51) Int. Cl.
*G06Q 10/00* (2006.01)
(52) U.S. Cl. ...... 705/28; 340/572.1; 340/10.1; 235/376; 715/202; 715/211
(58) Field of Classification Search .............. 705/7, 28, 705/401; 715/202, 211; 235/376, 375; 340/5.92, 340/10.1, 572.1; 370/428, 465; 707/6, 999.002, 707/999.005; 710/1
See application file for complete search history.

(56) References Cited

U.S. PATENT DOCUMENTS

| | | | | |
|---|---|---|---|---|
| 5,916,307 A * | 6/1999 | Piskiel et al. | ................. | 719/314 |
| 6,122,639 A * | 9/2000 | Babu et al. | ............................. | 1/1 |
| 2002/0161671 A1* | 10/2002 | Matsui et al. | ...................... | 705/27 |
| 2004/0088415 A1* | 5/2004 | Chandrasekar et al. | ...... | 709/226 |
| 2005/0076159 A1* | 4/2005 | Machida et al. | .................. | 710/1 |
| 2005/0092825 A1* | 5/2005 | Cox et al. | ....................... | 235/375 |
| 2005/0264401 A1* | 12/2005 | Haller et al. | ................. | 340/10.1 |
| 2006/0133412 A1* | 6/2006 | Callaghan | ...................... | 370/465 |
| 2006/0145813 A1* | 7/2006 | Haller et al. | ................. | 340/10.1 |
| 2006/0184410 A1* | 8/2006 | Ramamurthy et al. | ........... | 705/8 |
| 2006/0190806 A1* | 8/2006 | Sasson et al. | .................. | 715/500 |
| 2006/0209868 A1* | 9/2006 | Callaghan | ...................... | 370/428 |
| 2007/0132589 A1* | 6/2007 | Kim et al. | .................. | 340/572.1 |
| 2007/0143162 A1* | 6/2007 | Keever et al. | ...................... | 705/7 |
| 2008/0001709 A1* | 1/2008 | Venkatesh et al. | ........... | 340/10.1 |
| 2008/0001751 A1* | 1/2008 | Gieseke et al. | ............. | 340/572.1 |
| 2008/0133294 A1* | 6/2008 | Kataria et al. | ...................... | 705/7 |
| 2008/0157933 A1* | 7/2008 | Winkler | ......................... | 340/10.6 |
| 2008/0172380 A1* | 7/2008 | Czyz et al. | .......................... | 707/5 |
| 2008/0284569 A1* | 11/2008 | Shah | ............................ | 340/10.1 |
| 2008/0288306 A1* | 11/2008 | MacIntyre et al. | ................. | 705/7 |
| 2009/0018996 A1* | 1/2009 | Hunt et al. | ......................... | 707/2 |
| 2010/0289627 A1* | 11/2010 | McAllister et al. | ........ | 340/10.42 |

OTHER PUBLICATIONS

"EPCglobal Inc.; EPCglobal Ratifies Global Standard for Secure, Real- Time Data Sharing." Obesity, Fitness & Wellness Week May 5, 2007: Research Library, ProQuest. Web. Dec. 10, 2010.*
"New data-sharing standard for RFID." Modern Materials Handling May 1, 2007: ABI/INFORM Global, ProQuest. Web. Dec. 10, 2010.*
"Oracle and Savi Technology Provide Critical Information Link to Track Active RFID-tagged Containers Shipped From Hong Kong to Japan; Oracle-Savi Collaboration Enables International Real-Time Cargo Container Tracking in EPCglobal Pilot Initiated in Asia. " PR Newswire Mar. 22, 2007 Business Dateline, ProQuest. Web. Dec. 10, 2010.*
"Business Update; EPCglobal ratifies electronic pedigree standard. " Biotech Week Feb. 7, 2007: ProQuest Health and Medical Complete, ProQuest. Web. Dec. 10, 2010.*

* cited by examiner

*Primary Examiner* — Matthew S Gart
*Assistant Examiner* — Olusegun Goyea
(74) *Attorney, Agent, or Firm* — Kilpatrick Townsend & Stockton LLP

(57) ABSTRACT

An RFID event tracking and management system provides a standardized approach that can be utilized by various industry verticals. Guaranteed event delivery can ensure that any event data captured by an RFID device is written to persistent storage. A first guaranteed commit process can ensure that event data captured by an RFID device is written to a persistent queue, and the event data is not released from the RFID device until the event data is verified to be in the persistent queue. A second guaranteed commit process then ensures that the event data in the persistent queue is written to persistent storage, and the event data is not released from the persistent queue until the event data is verified to be in the persistent storage.

20 Claims, 16 Drawing Sheets

GUARANTEED RFID EVENT DELIVERY

COPYRIGHT NOTICE

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

BACKGROUND OF THE INVENTION

The present invention relates generally to tracking and data management systems, and more particularly to inventory tracking and data management systems useful for determining information in a supply chain or similar application.

In recent years, ever more attention has been paid to accurate location determination and efficient allocation of items in supply management systems. Such systems can include warehouse management systems, supply chain management systems, inventory management systems, enterprise resource planning systems, and the like. Merely by way of example, modern warehouse management systems ("WMS") often are complex software packages that run on top of a relational database management system ("RDBMS"), such as the Oracle 10g™ RDBMS available from Oracle International Corporation of Redwood Shores, Calif.

A key technology being used with WMS is Radio Frequency Identification ("RFID"). As known in the art, an RFID "tag" can be applied to an item, such as an item of inventory, so that the presence of an item can be sensed when that item passes near an RFID detector or other such sensor. For example, a retailer may utilize RFID tags on items in order to quickly determine how much inventory of a certain item the retailer has in stock. An RFID tag typically includes an RFID chip and a transmitter, which can take the form of an antenna positioned about the RFID chip. The antenna/transmitter comes in many forms as known in the art, such as spirals or other complex patterns. RFID tags have advantages over previous tracking technologies, such size and type could have an identical bar code attached thereto. A retailer could then individually scan all bottles of soap in the store, and determine the number of bottles of a certain type and size in the store. Such an approach is not ideal for many applications, as it requires individually scanning each item. Further, it only contains information identifying a type and size of a particular product, and does not contain any information about that particular instance of the product.

RFID tags, on the other hand, allow for automated bulk scanning and tracking, and can provide unique information about each particular instance of an item or tag. An RFID tag can be read by any appropriate detector within a given radius, such that a pallet of products passing near an RFID reader or other sensor, such as may be attached to a shipping or receiving door, for example, can allow each of the items on the pallet to be scanned virtually simultaneously as the pallet passes by the antenna of the RFID reader. The range of the RFID tag and the reader can depend in part on the type of tag, such as whether the tag is an active tag (including an internal battery) or a passive tag (powered by radio waves from the RFID reader).

Further, the information read by the RFID reader for each item can identify each particular instance of an item, as well as other appropriate information. Current standardization efforts for RFID tags, such as are being set forth the EPCglobal consortium, provide for 96 bits of identification information in each individual tag in a set format. The use of 96 bits in a standard format allows each tag to include, for example, bits representing the company or entity (such as an identifier assigned by UCC.EAN), bits representing the product, item, or object class, and bits representing a unique serial number for that particular instance of the product. There is a also provision for 128 additional user bits of data which can store additional identification information which can be read by a Gen2 Compatible RFID reader. Because different formats may be appropriate for different industries, the tag also can include a few header bits indicating the format to be used in interpreting the tag information.

As RFID technology becomes more widely accepted, entities such as large retailers are increasingly mandating that their suppliers include RFID tags with each shipment received by that entity, and are moving toward mandating that each individual item include an RFID tag. In another example, FDA regulations mandate that each instance of pharmaceutical packaging be separately identifiable in order to determine information such as lot number and expiration date for each instance. Further, various entities a particular instance.

Considering an exemplary flow of goods 100 shown in FIG. 1(a), Manufacturer A 102 may sell a first type of goods 104 through Primary Wholesaler A 106. Manufacturer B 108 may sell a second type of goods 110 through Primary Wholesaler A 106. Primary Wholesaler A may sell the goods of Manufacturers A and B through Secondary Wholesaler B 112, who in turn may sell to a retailer such as Pharmacy A 114. When an item is shipped and/or received from any of these entities, the RFID tag of the item can be detected and the information fed to a database that can be accessed by the other entities in order to determine the location of that item. For example, as shown in the arrangement 120 of FIG. 1(b), each entity may have a respective database 122, 124, 126, 128, 130 that is accessible by each other associated entity, so that each entity along the supply chain can run queries against the databases, and capture information to the databases, in order to determine the location of an item in the supply chain.

In another example, FIG. 2 shows a supply chain 200 wherein each of a Manufacturer 202, third party carrier 204, Customs Agency/Location 206, Carrier 208, and Importer 210 might scan RFID tags and store the data for access in a local database (or remote or shared database) by any of the other entities.

Each time an RFID tag is read by a tag reader or other appropriate hardware used in the art for scanning, sensing, or detecting tags, an RFID event is triggered. An RFID event typically involves the reading of an RFID tag and storing of the relevant information (such as is contained in the 96 bits), as well as the time of the event and the location of the reader (or other device) sensing the tag. This information then can be passed to an interface that determines whether the event is a relevant business event and, if so, the information can be associated to an appropriate business object and/or stored in an appropriate location for later retrieval.

FIG. 3 shows an example 300 of event types that can be generated in accordance with the proposed EPCglobal standard. These events can include Object Events 302, Aggregation Events 304, Quantity Events 306, and Transaction Events 308, each of which can be stored in a relational database 310 for querying of data through an appropriate query interface 312 and/or capturing of data through an appropriate capture interface 314. The events can be triggered and directed through an appropriate event tracking system as known in the art. The RFID events captured typically are considered to answer four questions, including "what" (e.g., the EPC number, manufacturing data, and transactional data), "where" (e.g., the location—fixed or moving), "when" (e.g., event time or record time), and "why" (e.g., the business process step, the product state, and the currently conditions). These can be matched with the four standard XML events described with respect to FIG. 3, which can be accepted by the relevant capture interface and returned by the query interface. These events also can be originated by enterprise systems as well as RFID reads. The attributes of each event can be extended for each event.

An example of such an event tracking system 400 is shown in FIG. 4. In this system, an RFID Tag 402 of an appropriate Tag Protocol passes within sufficient proximity of an RFID Reader 404, so as to generate an RFID event. The RFID Reader can be managed via a Reader Management Interface and/or Module 406. The RFID event is passed through a Filtering and Collection Module 408 (referred to as RFID middleware), and Interface 410 before being captured by a Data Capturing Application 412. The Data Capturing Application can capture EPCIS data (Electronic Product Code Information Service), for example. The event information then is written to a Data Repository 414, such as the EPC databases shown in FIGS. 1(b) and 2. The Data Repository can be part of a service module 416, which can include the query and capture interfaces mentioned above. Various Subscribers 418, 420 to the service then can query data from the Data Repository to which those subscribers have access. Various applications and services 422, 424, 426, 428 can be built on top of the service layer.

In the system of FIG. 4, the capture and query interfaces are standardized to enable functionality such as track and trace, product authentication, and diversion detection across supply chain partners across multiple industries. For security purposes, each trading partner can maintain their own data, with events being distributed with trading partners on an on-demand bases. The events can be routed to existing enterprise applications, with no vendor "lock-in" in terms of data formats, transport protocols, etc.

Various problems can arise in such a system, however. For example, there is no current standardized way to ensure that any particular data for an entity can only be seen by certain entities along the supply chain. Further, as each entity maintains its own data, there can be problems with loss of data and data reliability. There also can be issues with handling incomplete data and/or handling data for different industries.

BRIEF SUMMARY OF THE INVENTION

Systems and methods in accordance with various embodiments of the present invention can overcome these and other deficiencies in existing event capture and compensation systems by providing guaranteed event delivery that ensures any event data captured by an RFID device is written to persistent storage. A first guaranteed commit process can ensure that event data captured by an RFID device is written to a persistent queue, the event data not being released from the RFID device until the event data is verified to be in the persistent queue. A second guaranteed commit process can ensure that the event data in the persistent queue is written to persistent storage, and the transaction is not released from the persistent queue until the event data is verified to be in the persistent storage.

In one embodiment, an event object for an RFID event is captured by an RFID device. The event object is captured to a sensor edge server using a first guaranteed commit process, such as a two-phase commit, to write event data into a persistent queue, such as a JMS queue. The sensor edge server verifies that the event data is in the persistent queue, and performs additional read/write attempts as necessary to capture the event data to the persistent queue. After the event data is verified to be in the persistent queue, the sensor edge server notifies the RFID device which then can release the event data.

The event data in the persistent queue then can be captured to a sensor data manager using a second guaranteed commit process to write event data into persistent storage, such as a data repository. The sensor data manager verifies that the event data is in the persistent storage, and performs additional read/write attempts as necessary to capture the event data to the persistent storage. After the event data is verified to be in the persistent storage, the sensor data manager notifies the persistent queue which then can release the event data.

A further understanding of the nature and the advantages of the inventions disclosed herein may be realized by reference of the remaining portions of the specification and the attached drawings.

BRIEF DESCRIPTION OF THE DRAWINGS

Various embodiments in accordance with the present invention will be described with reference to the drawings, in which.

DETAILED DESCRIPTION OF THE INVENTION

Systems and methods in accordance with various embodiments can overcome the aforementioned and other deficiencies in existing tracking and data management systems. Various embodiments can prevent loss of event data, such as RFID generated through an RFID event, and can allow for specific control over access to event data. Embodiments further can provide for the handling of incomplete data records, as well as the ability to utilize a common, core data model to generate custom data models for various industry verticals.

Figure 5:
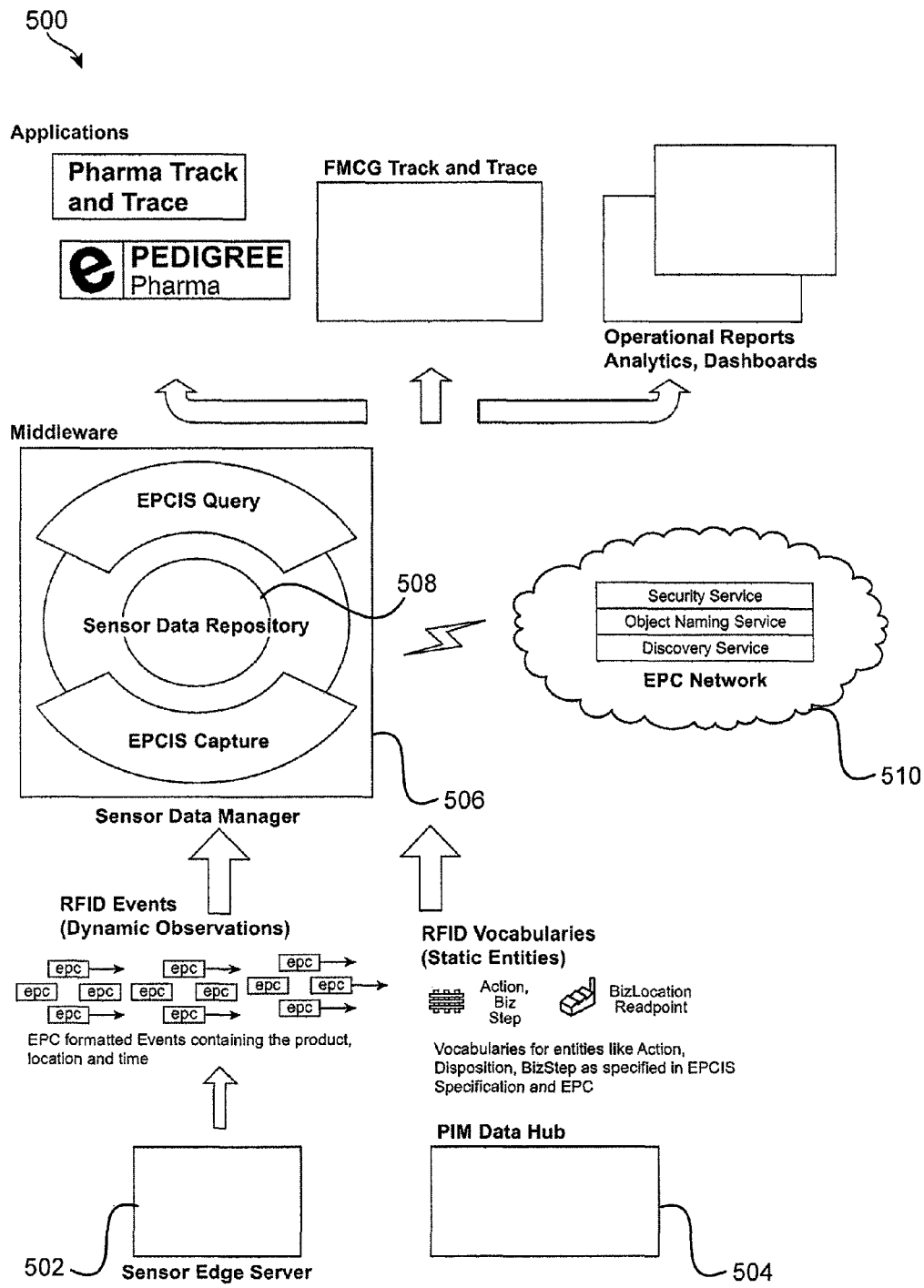
FIG. 5 illustrates a an event tracking and data management system in accordance with one embodiment of the present invention.

An illustrative system 500 in accordance with one embodiment is shown in FIG. 5. This system includes a sensor edge server 502 that is responsible, at least in part, for device and hardware management. The sensor edge server architecture can be selected such that the edge server 502 can manage hardware components such as RFID readers, light stacks, conveyor belts, and various sensor-based devices. The edge server can include the sensor data manager or persistent data store discussed above. The sensor edge server supplies the event data, such as by providing data for RFID or EPC events, which contain product, location, and time information as discussed above.

The system also includes a product information management (PIM) Data Hub 504. This data hub provides dimension information such as product and location data, which can be correlated with the event data from the edge server 502. Correlating the dimension data with the event data allows for interpretation of the event data, as well as querying based on product and location information. For example, the event data might include a code indicating an RFID reader that generated the event, but the identity of the RFID reader may be difficult to discern without the location data from the PIM Data Hub, which can indicate that the reader is at the shipping door of Wholesaler A, for example, thereby indicating that the product has left Wholesaler A. A query then can be run on items that have left Wholesaler A, without having to know the exact reader code (which may of course change over time, and there may be multiple such readers). The product information also can be correlated so that a query can be run on a type of item in the supply chain without having to know the exact codes for each individual item (or pallet of items, for example).

The event data (or "fact" data) from the edge server 502 in this embodiment is fed to a sensor data manager 506, or information service module, which also obtains dimension data from the data hub 504. The data manager 506 then can correlate the event and dimension data, in order to obtain a full data record for each event that is queryable based on product and/or location information. The data manager stores the data records in persistent data storage 508 that is accessible by entities in the relevant network 510, such as to subscribers. Once the event information is stored in persistent storage, applications such as Track and Trace and ePedigree can run on top of the Information Service layer and utilize the event information. The applications can take advantage of the capture interface 604 and/or query interface 602 of the information service data manager 600, such as is shown in more detail in FIG. 6. As can be seen, the data manager can include various other components such as services and user interfaces ("UI"s). It should be understood that this architecture is merely exemplary, and that many other such configurations and components could be used for these and other purposes as would be understood to one of ordinary skill in the art in light of the teachings and suggestions contained herein.

Security

Figure 1A:
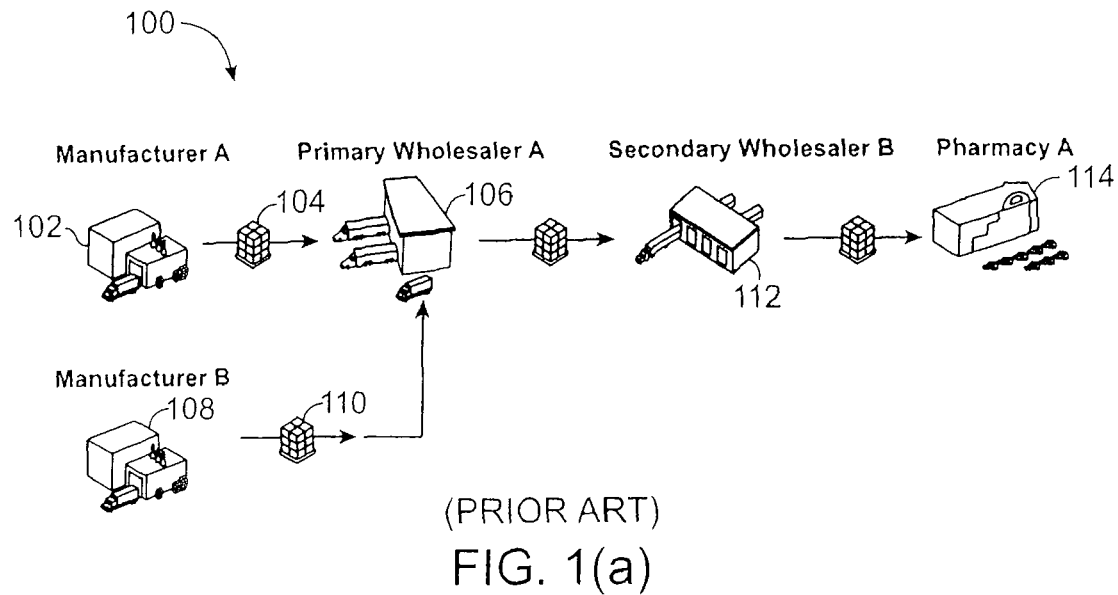
FIGS. 1(a) and 1(b) illustrate supply chains of the prior art.
Figure 1B:
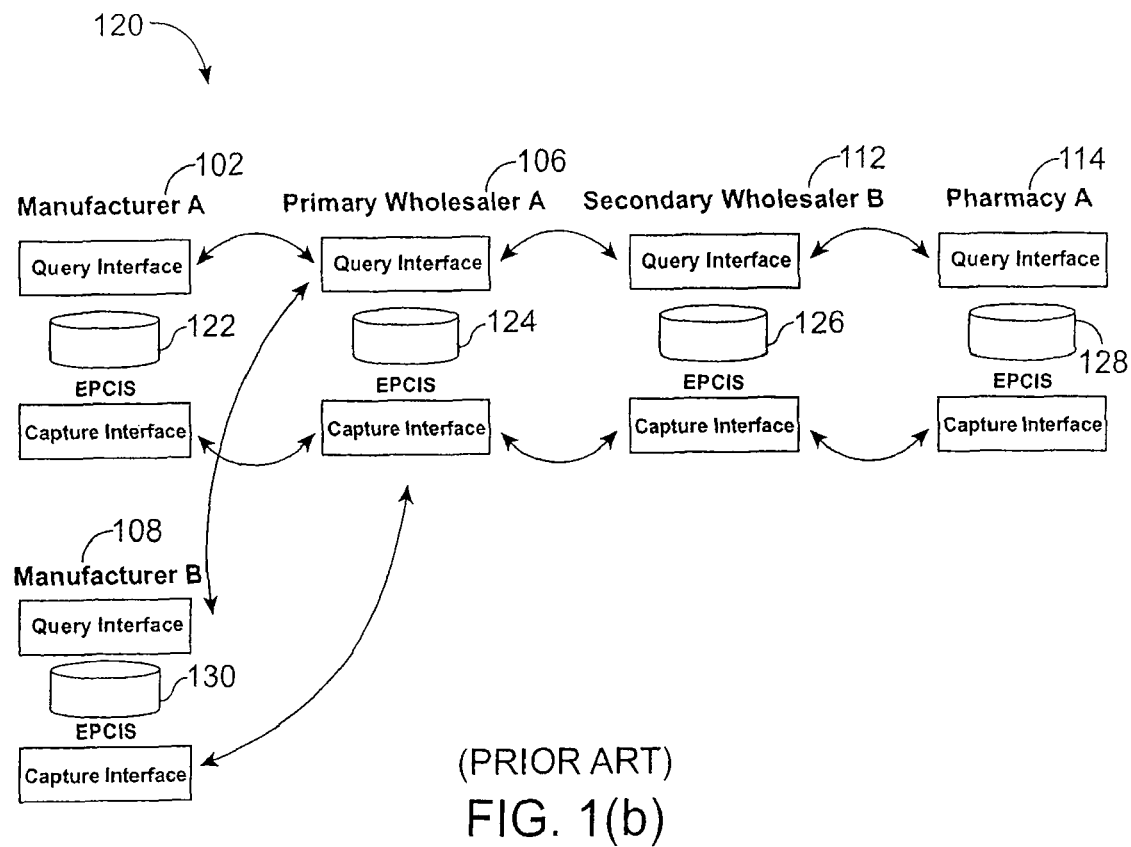
Figure 2:
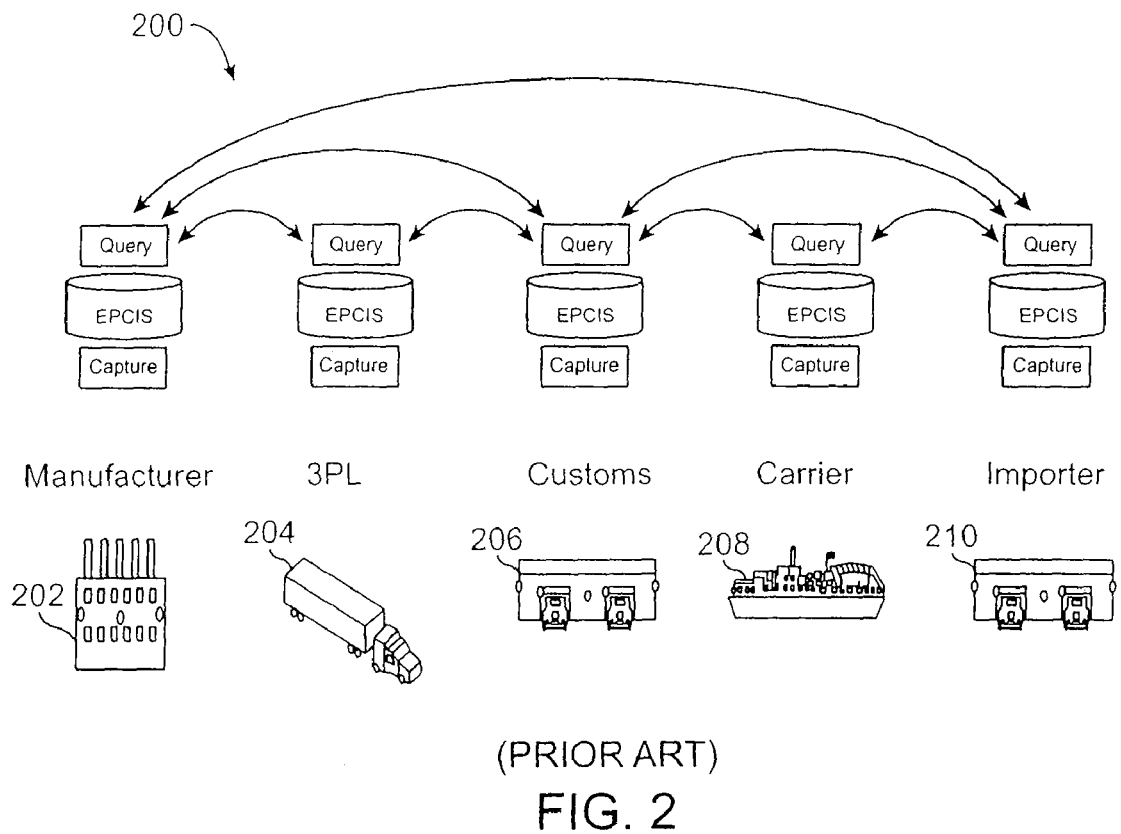
FIG. 2 illustrates a supply chain of the prior art.
Figure 3:
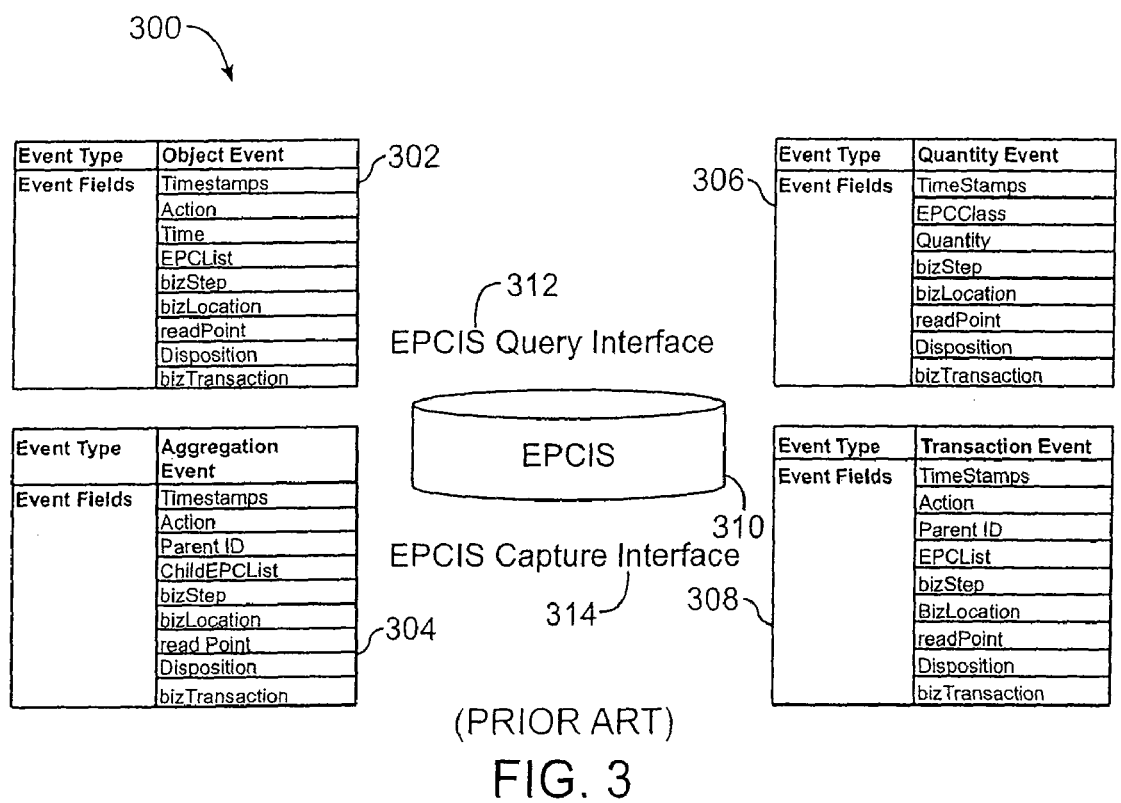
FIG. 3 illustrates event types of the prior art that can be used in accordance with one embodiment of the present invention.
Figure 4:
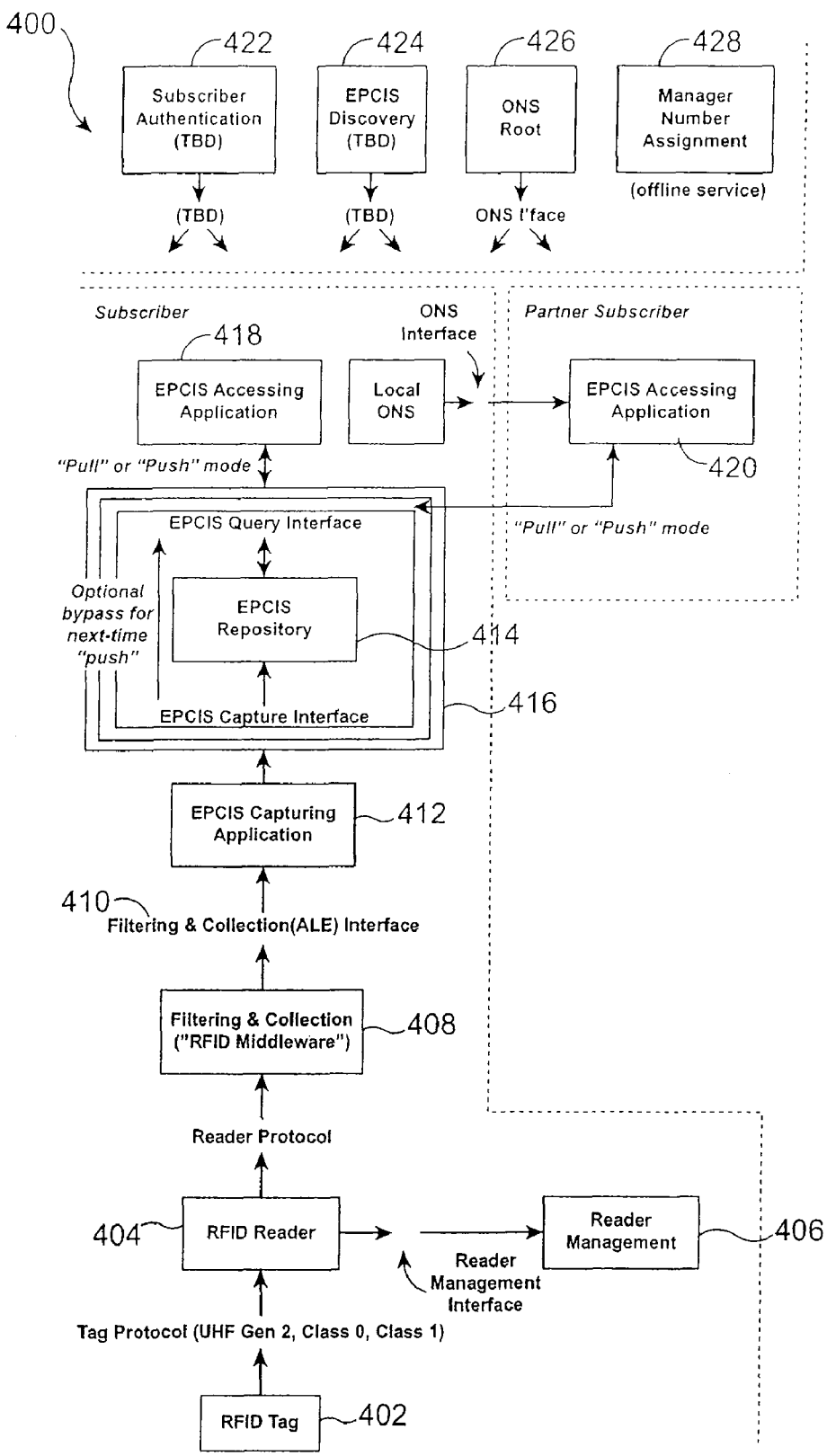
FIG. 4 illustrates an event tracking approach of the prior art that can be used with systems in accordance with one embodiment of the present invention.

As discussed above with respect to FIG. 1(*b*), different entities such as different manufacturers may send products to at least one common entity, such as a wholesaler and/or retailer. In current systems, the security functionality restricts access to information for the supply chain based on association with the supply chain. This could take the form of a username and password, for example, that allows anyone along a supply chain to track information about events along the supply chain. Difficulties arise, however, in preventing certain entities from seeing data for other entities along the supply chain. Suppose Manufacturer A 102 and Manufacturer B 108 in FIG. 1(*b*) sell competing products that are delivered through wholesalers A and B to Pharmacy A 114. If Manufacturer A is adjusting the price of the competing product, or will be unable to ship a sufficient quantity of that product, obtaining such information before those items reach Pharmacy A could give Manufacturer B an unfair competitive advantage, as Manufacturer B could adjust the quantity and/or price of its competing product before that product reaches the pharmacy. Accordingly, it is desirable to not only secure access to only those entities along the supply chain, or associated with the supply chain, but to also allow entities along the supply chain to restrict access to specific information as it relates to the supply chain.

Figure 6:
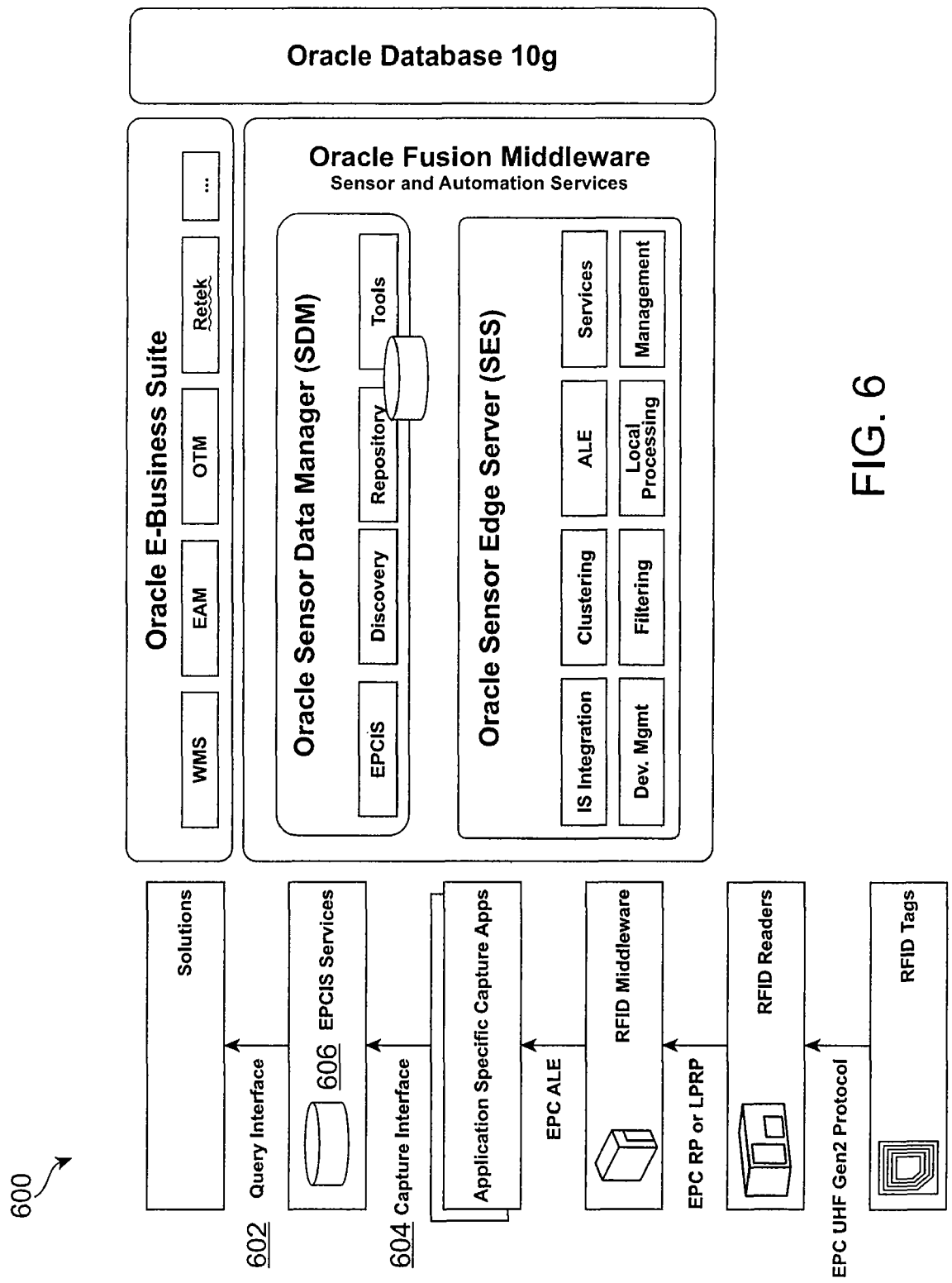
FIG. 6 illustrates an information service module in accordance with one embodiment of the present invention.

One way to provide this additional level of security is to provide various services 606, such as is shown tin FIG. 6. The service can be configured such that any entity associated with a supply chain (or other appropriate application) is able to query any other entity in the supply chain, but can be restricted from seeing particular data for any other entity along the chain. For example, Manufacturer A can query Wholesalers A and B, as well as Pharmacy A in FIG. 1(*b*), but will be unable to see data for Manufacturer B, even though Wholesalers A and B and Pharmacy A might each include data results for both Manufacturer A and B that would match a particular query. For example, if Manufacturer A queries Wholesaler A to determine which items Wholesaler A shipped on a given day, the result set might include data for both Wholesaler A and Wholesaler B, but Wholesaler A will only see the data for Wholesaler A. Such an approach provides security not only at an authorization level, but also at a data visibility level.

Figure 7:
FIG. 7 illustrates spreadsheets that can be produced in accordance with one embodiment of the present invention.

FIG. 7 shows illustrative spreadsheets 700 representing object event data that can be returned in response to such a query. If the security is only at the authorization level, with no data visibility security, the resulting spreadsheet 702 will show all of the data matching the query, regardless of the associated entity. In one approach to data visibility, column-level security can be applied that hides certain columns from a relational perspective in the resulting spreadsheet 704. The column hiding approach can solve part of the problem, but a wholesaler or manufacturer typically will not be at a column level. Such an entity instead may be represented at a row level (as each row here represents an event), which can represent a shipment of items from a particular entity being received, for example. Therefore it also can be desirable to provide row level security so that the resulting spreadsheet 706 can hide data at a row level.

Problems can still arise, however, as an event may represent a combination of individual events, such as a shipment of items from a wholesaler that includes items from both Manufacturer A and Manufacturer B, for example. In this case, Manufacturer A may still want to see data for the event, but should be restricted from seeing the data for that event that is representative of Manufacturer B. It therefore can be desirable to provide another level of security, such as one that is unit or cell based. Using such an approach, the resulting spreadsheet 708 can show all data for an event that is relevant to a particular entity, while hiding any data to which the entity should not have access. Any particular data for the event then can be restricted or hidden as desired.

An approach to providing such unit-level security in accordance with one embodiment utilizes a virtual private database (VPD) on an event data model or event schema to support data visibility across the supply chain. The use of a VPD can provide a granularity of securing visibility of the data at the row, column, and cell levels, based on the role of the entity in the supply chain. This is referred to herein as role based visibility control, whereby access to create and capture of the data is controlled. Data can be shared while maintaining proper data visibility.

Figure 8:
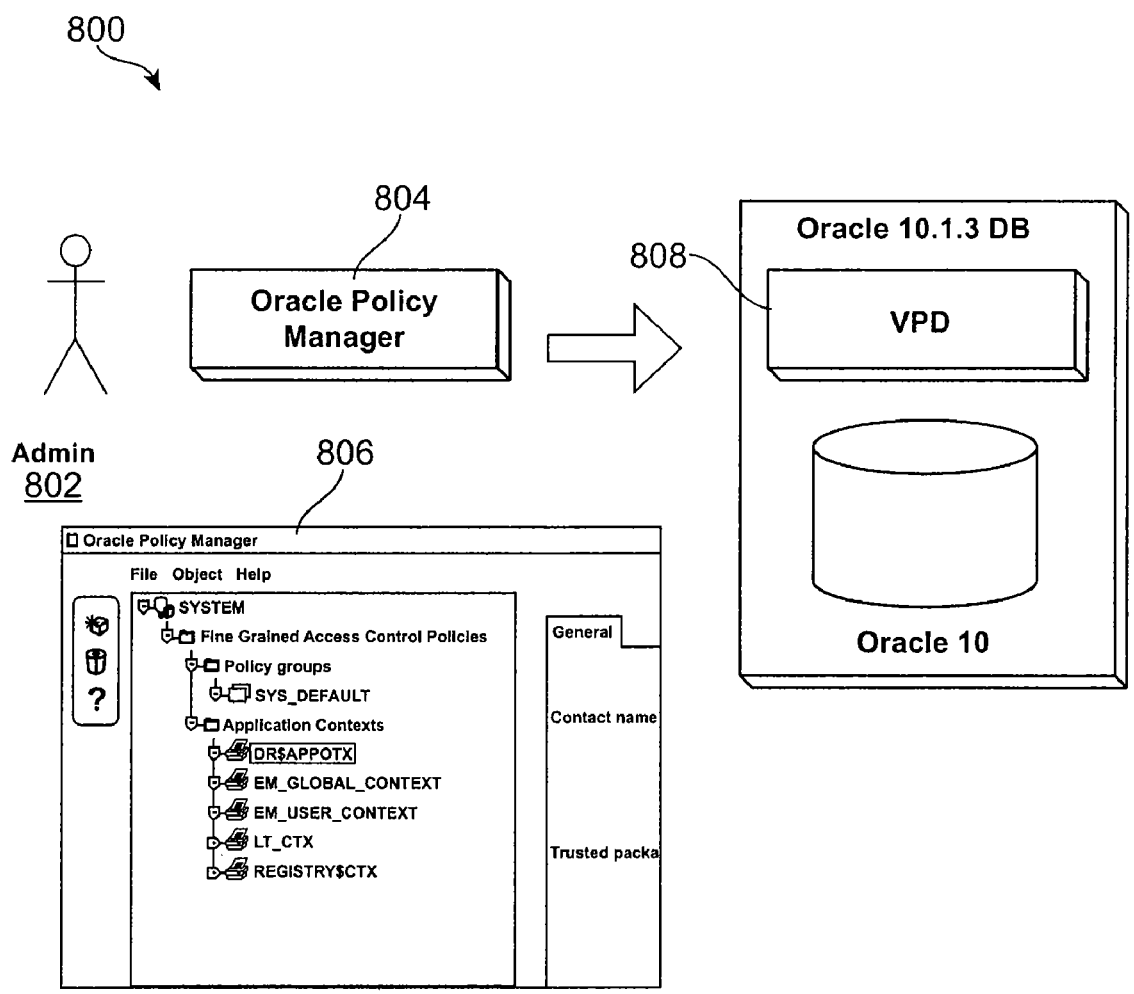
FIG. 8 illustrates a system architecture in accordance with one embodiment of the present invention.

An illustrative architecture 800 for providing such role based control is shown in FIG. 8. In such an example, an administrator 802 can utilize a policy manager UI 804 to access a policy manager 806 (such as Oracle Policy Manager available from Oracle Corporation of Redwood Shores, Calif.) for the system, which can provide for user management, role management, and policy management, such as at the row level, column level, cell level, and a combination thereof, for example. The policy manager can utilize the VPD 808, which provides access control so that when a user subscribing to the security service queries the VPD through a query interface, the VPD will automatically hide the appropriate data as the VPD is able to determine the identity or role of the query user and the polices that are in place. The same can apply to an event capture user, from which data can be captured through an event capture interface. The event capture user can have certain permissions that limit the data that can be inserted into the VPD based on the role of that capture user in the supply chain.

Figure 9:
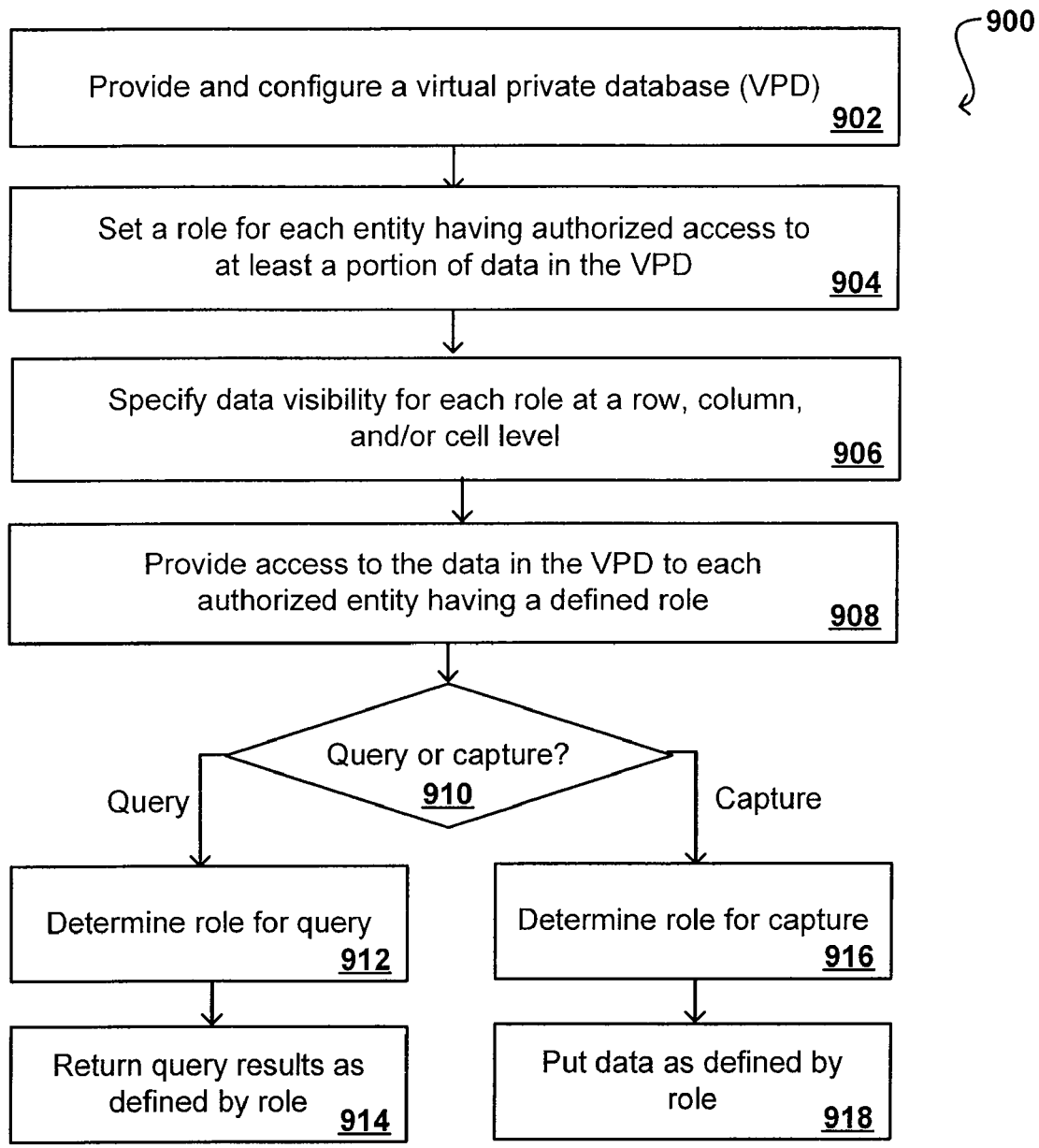
FIG. 9 illustrates a method that can be used in accordance with one embodiment of the present invention.

FIG. 9 shows an exemplary method 900 that can be used in accordance with one embodiment. In this method, a virtual private database (VPD) is provided 902. A role is then set for each entity having authorized access to data in the VPD 904. Data visibility is specified for each such role at a row, column, and/or cell level 906. An authorized entity then is able to query data from, or capture data to, the VPD 908. If the entity is attempting to query data 910, the role for that entity is determined 912. Results for the query are then returned to the entity showing data as defined by the role for that entity 914. If the entity is attempting to capture data 910, the role for that entity is determined 916. The data is then put to the database as defined by the role for that entity 918.

An example of a VPD is the Virtual Product Database provided by Oracle International Corporation of Redwood Shores, Calif. Oracle's VPD is an aggregation of server-enforced, fine-grained access control, together with a secure application context in an Oracle Database. This VPD provides a flexible mechanism for building applications that enforce desired security policies customers only where such control is necessary. By dynamically appending SQL statements with a predicate, VPD limits access to data, such as at the row level, and ties the security policy to the table (or view or synonym) itself. Users cannot bypass security policies embedded in applications because the security policy is attached to the data. The same security policy is automatically enforced by the data server, no matter how a user accesses data, whether through a report-writing tool, a query, or through an application, or emerging methods like Web Services.

The VPD is enforced at the database layer and takes into account application-specific logic used to limit data access within the database. Both commercial off-the-shelf applications and custom-built applications can take advantage of its granular access control, without the need to change any lines of application code.

Fine-grained access control relies upon "dynamic query modification" to enforce security policies on the objects with which the policies are associated. Here, "query" refers to any selection from a table or view, including data access through a select, query-for-update, insert or delete statements, or a sub-query, not just statements which begin with SELECT. A user, directly or indirectly accessing a table, view or synonym with an associated security policy causes the server to dynamically modify the statement based on a "WHERE" condition (known as a predicate) returned by a function which implements the security policy. The user's SQL statement is modified dynamically, transparently to the user, using any condition which can be expressed in, or returned by, a function. Functions which return predicates can also include callouts to other functions; a C or Java callout can be embedded within PL/SQL.

Upon logging into the system, the data server can set up an application context in the user session. Information in the application context can be defined based on information relevant to the supply chain, for example. An application, in this case, could initially set up an application context for each user upon login and populate the context with data queried from the appropriate table(s).

The system can enforce that context names ("namespaces") are unique across an entire database, to ensure that contexts cannot be duplicated or spoofed by individual users, either inadvertently or maliciously. Also, the ability to create an application context can be a separate system privilege; only suitably-privileged users are able to create a context. The database ensures that whenever a context attribute is set, it is the trusted package (implementing the context) and only the trusted package that sets the context attribute. The database checks the call stack, thereby ensuring that the trusted package is issuing a call to set an attribute. As a result, system security officers can allow applications to base security decisions on application contexts, because they can be assured that the context is set correctly by a trusted and known package (and not a malicious user or process).

Applications can utilize global application context to supply user identity to the database, which in turn utilizes the identity for access control decisions. Secure application context can be shared across sessions. The three-tier architecture is the cost common model for delivering highly effective, scalable, high-performance information systems. The middle tier application or application server establishes necessary application logic and performs application-specific operations, while the database provides the scalability, security and availability required for various applications. The global application context increases performance for systems running in a three-tier environment. Because the middle tier server does not create a new user sessions for each connection to the database, global application context enables applications to scale in a security-conscious manner.

The Policy Manager can be a Java-based GUI administration tool for managing Virtual Private Database policies and application contexts. The same tool also can manage policies for other security services The Policy Manager can provide a standard interface easing the administration of VPD policies and application contexts and is especially useful for large implementations employing multiple policies on various tables, views or synonyms. The tool does not replace the coding involved in deploying a Virtual Private Database. However, it greatly simplifies the administration involved in managing VPD policies, application contexts, and global application contexts.

Event Compensation

Another problem with existing systems involves the interpretation and exposure of event data. For example, when an RFID tag is read by an RFID Reader, an RFID event is generated that can include the 96 bit number for the item, along with information identifying the time and location of the event. In order to more readily discern the details of the event, that information needs to be interpreted using the appropriate dimension data (also referred to herein as master data). For example, as discussed above, the location data with the event may simply be a code for a particular reader, and the dimension data may include information identifying the location of the reader such as at the shipping door of Supplier A. It would be desirable to be able to query on items shipped from Supplier A, without having to know the exact codes for each current reader at the shipping points of Supplier A. Also, it might be desirable to query to determine which particular instances of Product A were shipped. Using only the event data from the edge server, it would be necessary to know the unique codes for each instance of the product or reader and query on each of those instances. Using the dimension data to interpret the event data allows an entity to instead query on a particular product or location and get data for all instances that were shipped, for example. Correlation thus is important for such reasons. Unfortunately, the master data may not be contained locally, or the local version might not be updated or complete, etc. For this reason, the master data might not always be available to use to interpret the data. It then is necessary to determine how to handle the event data in these cases.

Figure 10:
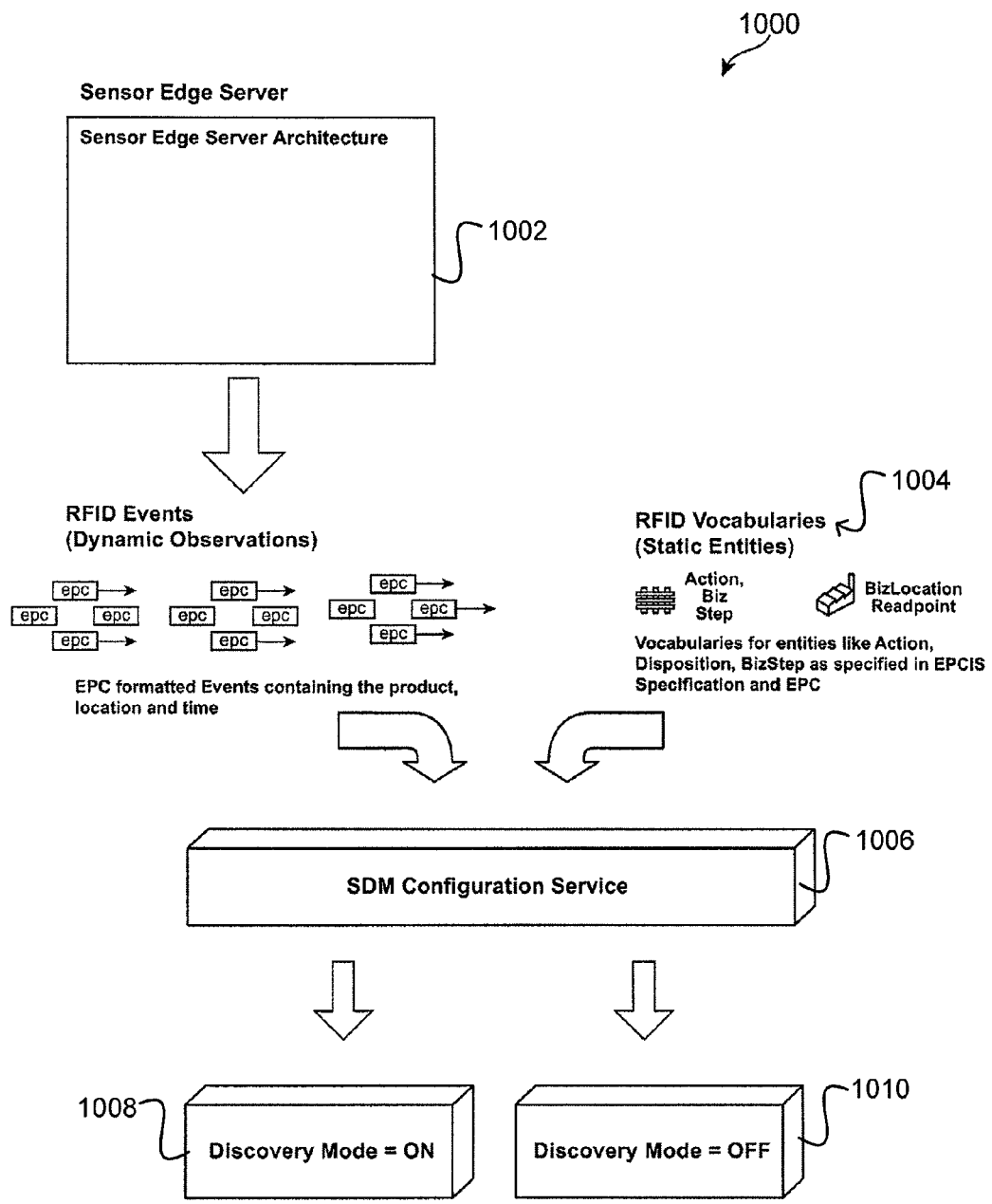
FIG. 10 illustrates a data compensation architecture in accordance with one embodiment of the present invention.

An illustrative system 1000 for capturing and/or correlating such data is shown in FIG. 10. In this system, the RFID event data is captured by the sensor edge server 1002, such described above. The edge server captures each RFID event, which can include the coded information for product, location, and time. The edge server 1002 can provide each event object to an event compensation service 1006, which can be contained in the event capture service of an information service module. The master data, including the dimension data for product and location information, can be stored in, and provided by, a product information management (PIM) Data Hub or the relevant source of truth for master data 1004. The PIM hub here is the source of information for the entire product and location catalog but the source of information may not be limited to one information system or service. The event compensation service 1006 can request and/or receive dimension data from the PIM hub to be correlated with the event data from the edge server 1002. If the event service has dimension data that can be correlated to the event data received from the edge server, the correlated data can be written to persistent storage and made available for querying by entities associated with the respective supply chain.

It then must be determined how to handle event data when the corresponding dimension data is not available, or has not yet been received, from the data hub or other source systems. An approach in accordance with one embodiment utilizes a sensor data manager that supports two modes for event data records, referred to herein as "discovery mode" 1008 and "compensation mode" 1010. In one embodiment, discovery mode is selected by enabling or "turning on" discovery mode, while compensation mode is enabled by "turning off" or deselecting discovery mode. If event data is received for which there is no corresponding dimension data available from the PIM data hub or other relevant source system, an appropriate mode can be applied to handle the event.

In discovery mode, which is relatively loosely coupled, the event can be allowed while the system attempts to discover the information about the event. A holder can be used to store and make the event data available for query until the master data is received that allows those events to be compensated. In one embodiment, the event data is loosely coupled with the master data and, hence, if all the relevant attributes do not map, the master data is discovered from the event data and later the relevant master data attributes are compensated. This mode does not ensure data integrity as some of the master data elements will be in raw form and will not add value to the query, except that the event data will always be available for query and "track and trace" type applications without tight relevance to presence of the master data attributes.

In compensation mode, or when discovery mode is turned off or disabled, which is more tightly coupled, the event is stored in a different repository due to a lack of understanding of the corresponding product, location, and vocabulary data. In such case, these events will not be available to the outside world until the events are automatically compensated and the missing master data is automatically inserted that would enable these events to be correlated. The choice of mode then determines when the event data is exposed to other entities with access to that data. The choice of whether to run in discovery mode or compensation mode can be made through the configuration module. The choice allows the entity to decide how much to force data integrity and whether to expose partial data or only expose data that has been fully compensated, particularly when the master data is not in place when an event comes into the system. If there are data elements in the event data which cannot be mapped to the relevant master data, the event will can be automatically compensated only through the compensation manager. The compensation manager will automatically create the missing master data elements like vocabularies, product, and location. Further, there can be an option to pick the core elements of EPCIS events such as Action, BizStep, and Disposition, which allows a user to obtain a range of elements that need to be tightly versus loosely coupled.

Figure 11:
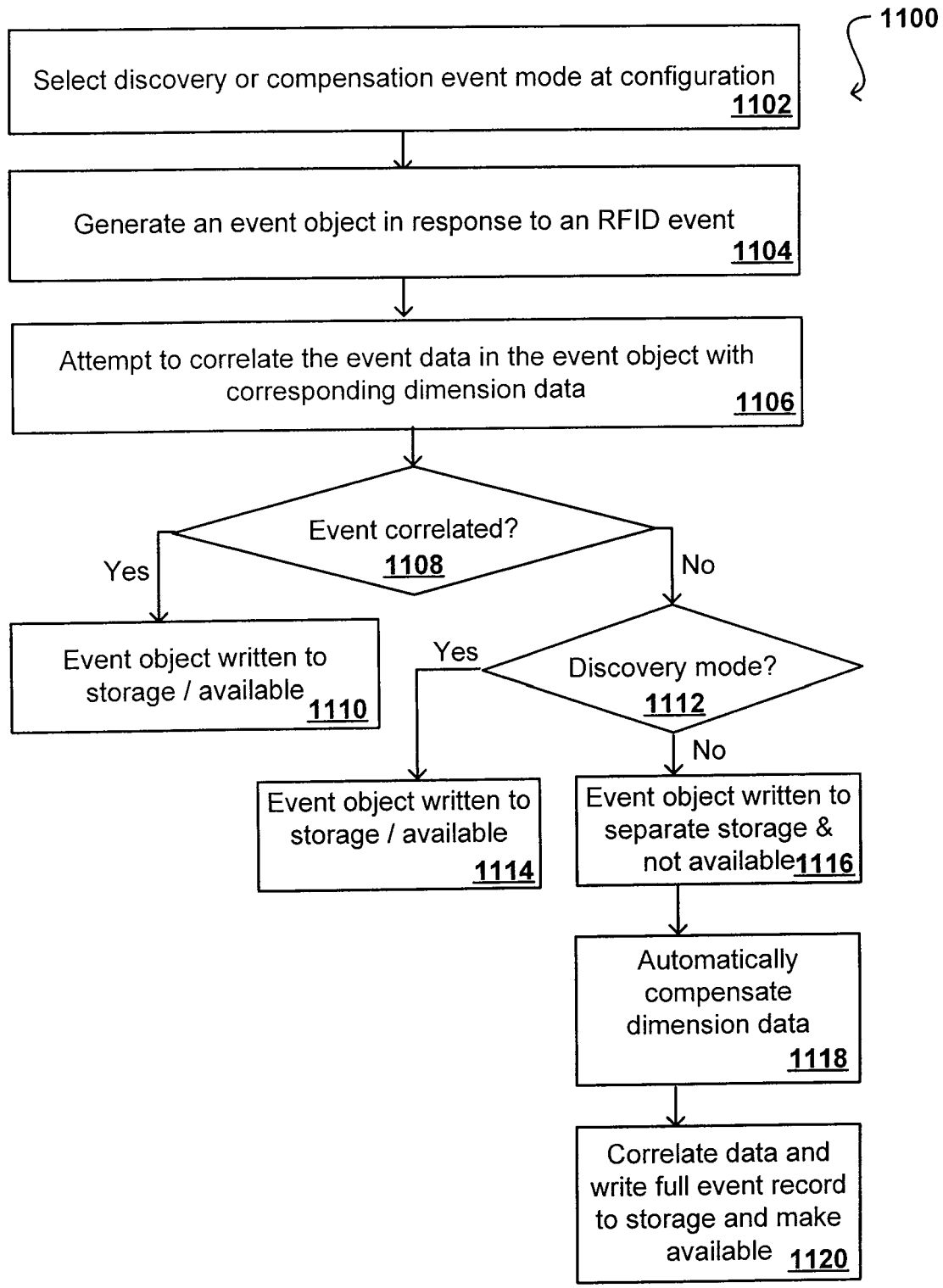
FIG. 11 illustrates a method that can be used in accordance with one embodiment of the present invention.

FIG. 11 shows steps of a flow chart 1100 including steps of a method for compensating an event in accordance with one embodiment. In this exemplary method, an administrator selects either discovery mode or compensation mode at configuration time 1102. An RFID event causes an event object to be generated by the sensor edge server 1104. An event compensation service attempts to correlate the event data with corresponding dimension data 1106. If the event data can be correlated with the appropriate master data 1108, an event object is written to persistent storage 1110. If the event data cannot be correlated, and the system is running in discovery mode 1112, an event object is written to persistent storage that is available for querying 1114. If the system is not running in discovery mode, but instead running in compensation mode, a event object is written to persistent storage that is not available for querying until it is automatically compensated 1116. The system automatically compensates the corresponding dimension data triggered through compensation manager 1118. The automated process can involve invoking other systems for requesting data, but there is no manual step to the process. The event data then is correlated and the full event object is stored in persistent storage and available for querying 1120.

Guaranteed Event Delivery

Another deficiency in existing systems is the occasional loss of event data. Currently at the hardware level only about 90-95% of the RFID tags passing sufficiently near a reader generate accurate RFID events. As the demands on RFID data increase, the accuracy of the hardware will also need to increase. There will always be some level of mechanical failures in tags and readers, but it would be desirable to prevent the loss of any RFID events that are accurately generated. In the event of a system or network failure, or any other such event leading to data loss as known in the art, data captured by an RFID reader, for example, may not be finally stored in persistent storage, or can be incompletely or inaccurately stored. This additional loss of event data can be unacceptable to many industries, particularly industries such as the pharmaceutical industry where any loss of data can result in a huge liability. It therefore is desirable to find a way to guarantee that, if a reader is able to read data for an item or tag, there is a guaranteed delivery that all products support so that event data will not be lost in the interim.

Figure 12:
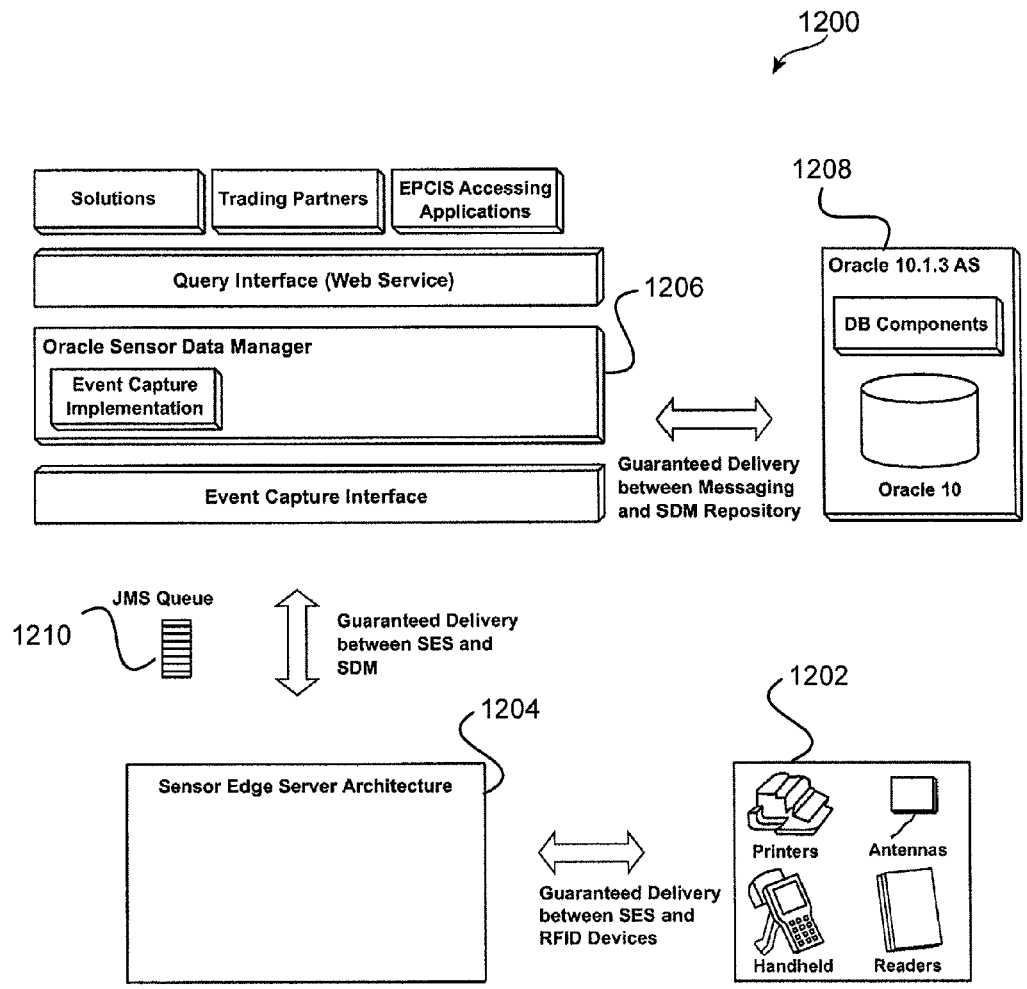
FIG. 12 illustrates a guaranteed event delivery architecture that can be used in accordance with one embodiment of the present invention.

A system for providing guaranteed delivery in accordance with one embodiment can generally be described with respect to three major components, although a number of other components and services can be used to provide full service as described elsewhere herein. In the exemplary arrangement 1200 illustrated in FIG. 12, the components are shown to include the external RFID hardware 1202 (including items such as antennas and readers), the sensor edge server 1204, and the sensor data manager 1206 (shown here to include the persistent data repository 1208, but it should be understood that the repository can be considered to be a separate component). The edge server 1204 in this example includes device drivers (not shown) that are able to directly read into the hardware 1202 to capture the event data. A guarantee mechanism can be in place as known in the art such that if the socket is open between the edge server and the hardware, the edge server can capture all event data read by the hardware. The read transaction for capturing the event data from the hardware can be implemented as a two-phase commit, or other guaranteed put or commit, which guarantees that data captured from the hardware is stored into an appropriate location, such as a messaging or JMS queue 1210. Placing the data into a locally available JMS queue allows the transactions to complete. If the data is never committed to the JMS queue, the data will not be removed from the hardware because the transaction will not be completed. Subsequent attempts then can be made to store the event data to the JMS queue. Only when the data is committed to the JMS queue is the data released from the hardware.

The system can include a second set of guarantee semantics to ensure a second guaranteed delivery between the messaging service or JMS queue 1210 and the repository or persistent storage 1208. This guarantee also effectively guarantees that whatever is read by the hardware 1202 will eventually reside in persistent storage 1208. An event object will remain in the JMS queue until the event object is written to persistent storage, such as by using another two-phase commit process. The event object is only released from the JMS queue when the object is verified to be in the database.

Figure 13:
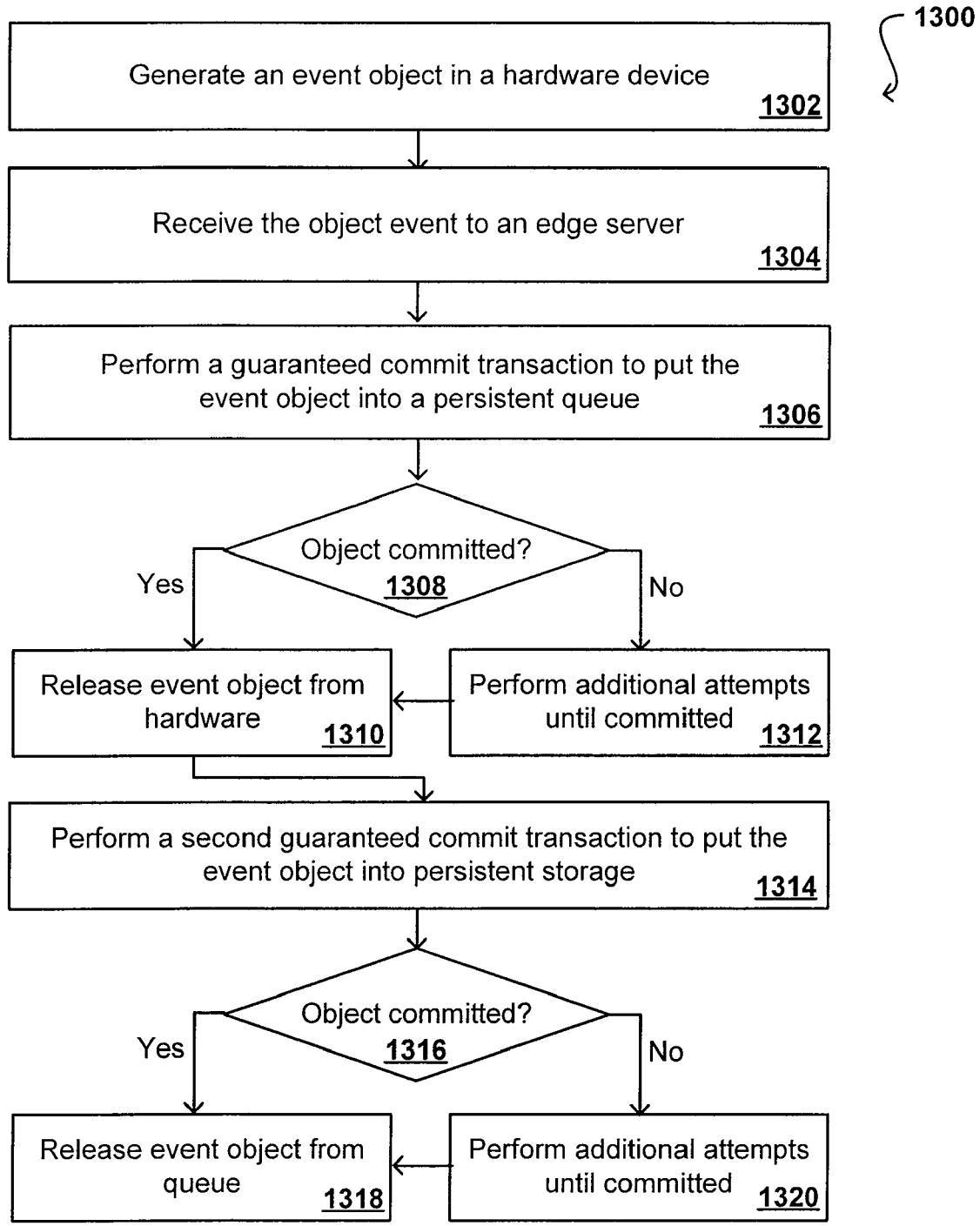
FIG. 13 illustrates a method that can be used in accordance with one embodiment of the present invention.

FIG. 13 shows steps of an exemplary method 1300 that can be used to guarantee delivery of events to persistent storage in accordance with one embodiment. In this method, an RFID event is generated by an RFID hardware device 1302. An edge server can receive an event object for the event from the RFID hardware 1304. A guaranteed commit process is used to put the data from the reader into a persistent queue 1306. If the event object is committed to the queue 1308, the event object is released from the hardware 1310. If the event object is not committed to the queue, additional commit attempts will be made until the event object is committed to the queue 1312, then the event object is released from the hardware 1310. Once the event object is verified to be in the messaging queue, a guaranteed commit process is used to put the data from the messaging queue into persistent storage 1314. If the event object is committed to the persistent storage 1316, the event object is released from the messaging queue 1318. If the event object is not committed to persistent storage, additional commit attempts will be made until the event object is committed to persistent storage 1320, then the event object is released from the messaging queue 1318. The event object is then guaranteed to be delivered from the RFID hardware to persistent storage, with no loss of data.

Vertical Data Models

Another problem with existing solutions is that each industry, and even different solutions within the same industry, have different ways of implementing event-based technology. For example, the use of RFID events for pharmaceutical industries is typically much different than for industries such as fast moving consumer goods (FMCG). For example, FMCG tracks and stores information such as new product introduction, e-proof of delivery, promotions management, and asset visibility. Pharmaceutical applications, on the other hand, may utilize applications such as counterfeit detection, e-Pedigree, and "track and trace" applications, and may require tracking of information such as a batch number, an expiration date, and an NDC (National Drug Code) code. Such data is not needed for industries such as FMCG. There also may be very different requirements for other industries, such as defense and aerospace industries.

Systems and methods in accordance with various embodiments provide for separate data models as necessary for different industries, etc., and generate these models using a core data model, such as the RFID data model provided by EPCglobal, as discussed above. One such system uses an object-oriented relational mapping utility or object-oriented database in order to define data models for the various industries on top of the core data model. The object-oriented database can include any appropriate database technology, such as TopLink, a Java object-to-relational persistence architecture available from Oracle International Corporation of Redwood Shores, Calif. Using the industry-specific data models, an object-oriented database is generated that can be used by all the vertical applications that sit on top of the database. TopLink then can be a source of the specific data models by providing the definitions and other functionality necessary to generate, save, and deploy the data models using the underlying core model.

Figure 14:
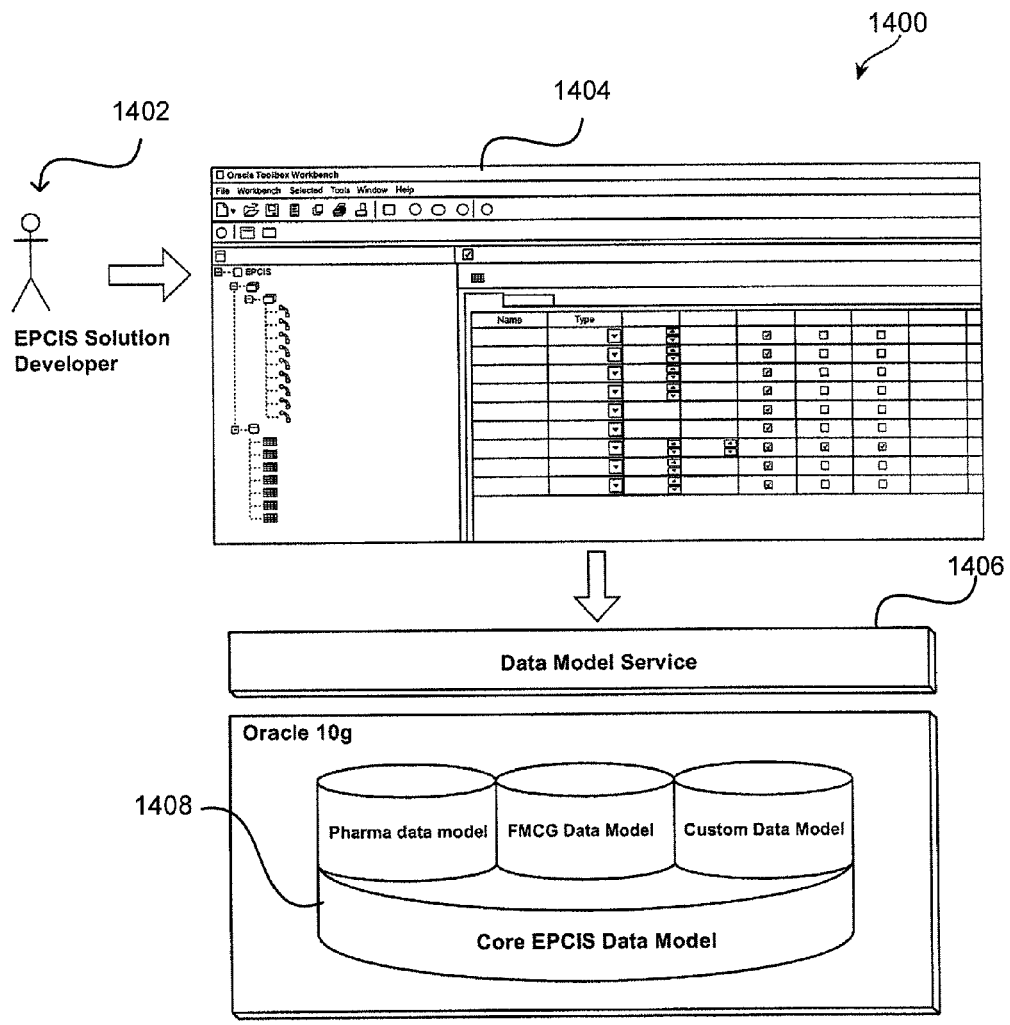
FIG. 14 illustrates a vertical data model architecture that can be used in accordance with one embodiment of the present invention.

As shown in the layout 1400 of FIG. 14, a solution developer 1402 can use an application interface 1404, such as the TopLink Workbench, to define object events having certain attributes based upon the core data model. An object such as a Java object can then be used to define XML data mappings and data, for example. Once the objects are defined, a data model service 1406 can provide access to the individual data models 1410 built on top of the core data model 1408. A data model service can be embedded in the application service module and the applications can be built on top of the individual data models. For example, an ePedigree solution can be built using a pharmaceutical data model associated with a pharmaceutical object event. The respective data model can be defined using the data model service, such that the query and capture interfaces can interact with the respective data model. Such an approach allows the data models to be dynamic, which is desirable as a single static data model is not appropriate for all industries.

Figure 15:
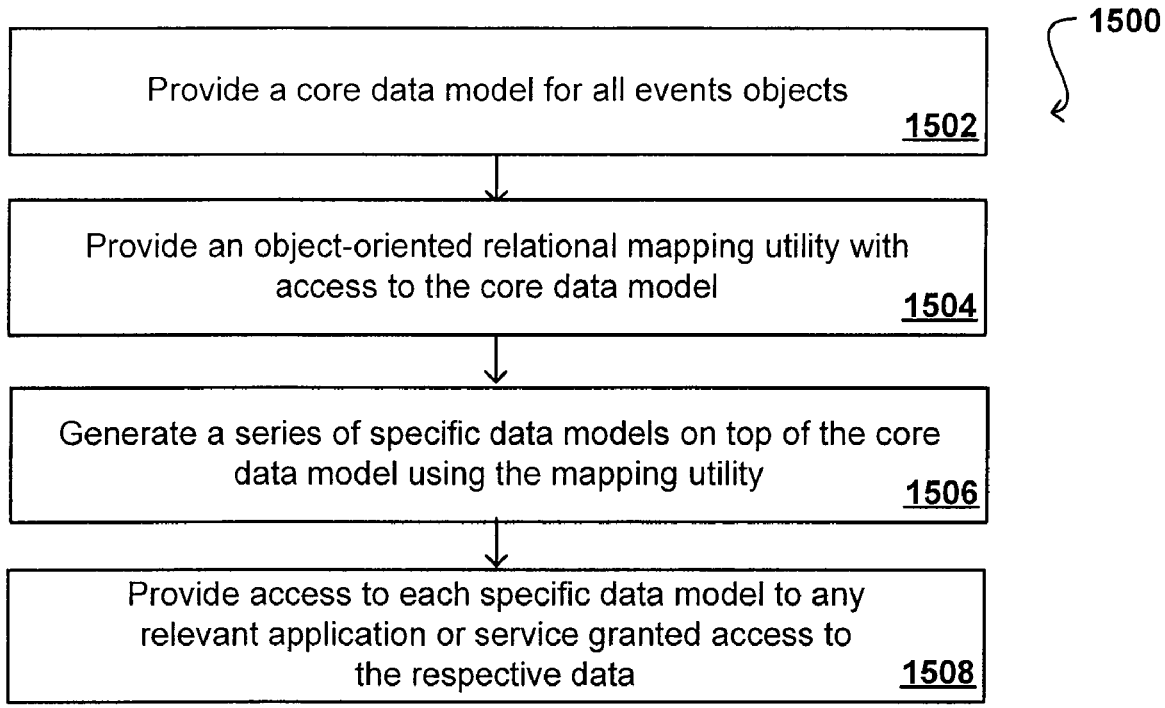
FIG. 15 illustrates a method that can be used in accordance with one embodiment of the present invention.

FIG. 15 shows an illustrative method 1500 that can be used in accordance with one embodiment of the present invention. In this method, a core data model is provided for all event objects 1502. An object-oriented relational mapping utility is provided with access to the core data model 1504. A series of specific data models is generated on top of the core data model using the mapping utility 1506. Access to each specific data model is then provided to any relevant application or service granted access to the respective data 1508.

A product such as TopLink product can include a Session front-end and a Data Access back-end. The Session and Data Access components can make use of mappings (project XML metadata), query framework, cache, and transaction components. Client applications (such as JSP, Servlet, and Struts) can access TopLink by way of the session. The session can provide access to a query framework and a transaction component. Both these components can benefit from the cache to minimize trips to the data source. In a J2EE container architecture, the transaction component can be integrated with JTA. The data access component can access the data source by way of JDBC in both J2EE Container and non-J2EE Container architectures. Client application entities (such as Java Objects and EJB Entity Beans) can take advantage of TopLink J2EE Container support for both container and bean managed persistence.

TopLink can be used to design, implement, deploy, and optimize an object-persistence and object-transformation layer that supports a variety of data sources and formats, including relational, object-relational, enterprise information system (EIS), and XML. TopLink also includes support for container-managed persistence (CMP) containers from a variety of vendors, and support for base classes that simplify bean-managed persistence (BMP) development. TopLink provides for the capture and definition of object-to-data source and object-to-data representation mappings in a flexible, efficient metadata format. The metadata, encapsulated in deployment XML files, lets configuration information be passed into the run-time environment. The run-time environment uses the information in conjunction with the persistent entities (Java objects or EJB entity beans) and the code written with a TopLink API, to complete the application.

A TopLink project contains the mappings metadata that the TopLink runtime uses to map objects to a data source. The project is the primary object used by the TopLink runtime. TopLink maps persistent entities to the database in the application, using the descriptors and mappings built with the TopLink workbench UI. The workbench supports several approaches to project development, importing classes and tables for mapping; importing classes and generating tables and mappings; importing tables and generating classes and mappings; and creating both class and table definitions. This toplink definition file which contains the datamodel, mappings and other definitions is exported as a deployment file available to the runtime.

A TopLink session contains a reference to a particular XML file, plus the information required to access the data source. The session is the primary object used by an application to access the features of the TopLink runtime. The agent responsible for creating and accessing session metadata differs depending on whether a CMP project is being created. In a non-CMP project, an application can acquire and access a session directly. In a CMP project, the application indirectly accesses a session acquired internally by the TopLink runtime.

Figure 16:
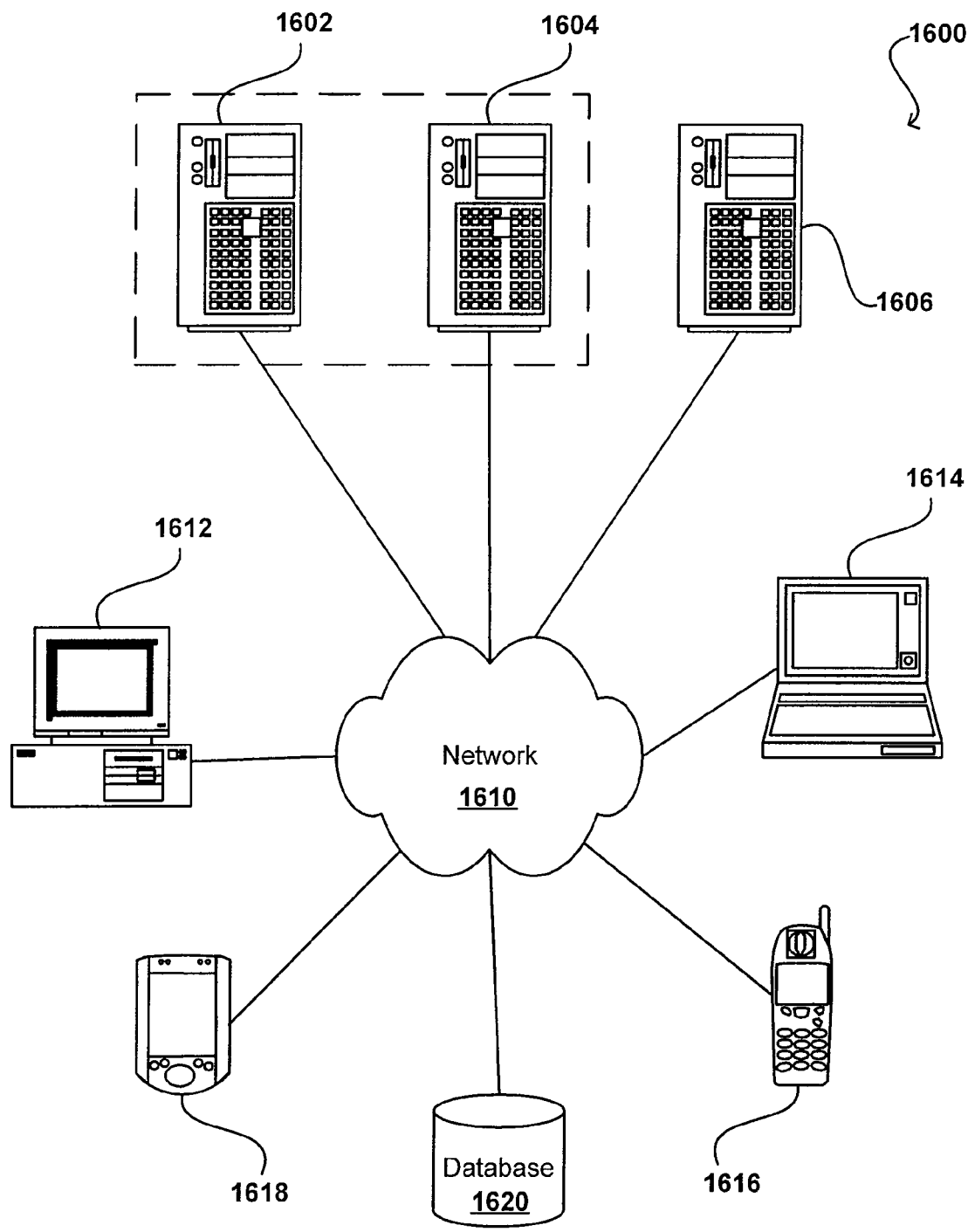
FIG. 16 illustrates components of a computer network that can be used in accordance with one embodiment of the present invention.

FIG. 16 is a block diagram illustrating components of an exemplary operating environment in which various embodiments of the present invention may be implemented. The system 1600 can include one or more user computers, computing devices, or processing devices 1612, 1614, 1616, 1618, which can be used to operate a client, such as a dedicated application, web browser, etc. The user computers 1612, 1614, 1616, 1618 can be general purpose personal computers (including, merely by way of example, personal computers and/or laptop computers running a standard operating system), cell phones or PDAs (running mobile software and being Internet, e-mail, SMS, Blackberry, or other communication protocol enabled), and/or workstation computers running any of a variety of commercially-available UNIX or UNIX-like operating systems (including without limitation, the variety of GNU/Linux operating systems). These user computers 1612, 1614, 1616, 1618 may also have any of a variety of applications, including one or more development systems, database client and/or server applications, and Web browser applications. Alternatively, the user computers 1612, 1614, 1616, 1618 may be any other electronic device, such as a thin-client computer, Internet-enabled gaming system, and/or personal messaging device, capable of communicating via a network (e.g., the network 1610 described below) and/or displaying and navigating Web pages or other types of electronic documents. Although the exemplary system 1600 is shown with four user computers, any number of user computers may be supported.

In most embodiments, the system 1600 includes some type of network 1610. The network may can be any type of network familiar to those skilled in the art that can support data communications using any of a variety of commercially-available protocols, including without limitation TCP/IP, SNA, IPX, AppleTalk, and the like. Merely by way of example, the network 1610 can be a local area network ("LAN"), such as an Ethernet network, a Token-Ring network and/or the like; a wide-area network; a virtual network, including without limitation a virtual private network ("VPN"); the Internet; an intranet; an extranet; a public switched telephone network ("PSTN"); an infra-red network; a wireless network (e.g., a network operating under any of the IEEE 802.11 suite of protocols, GRPS, GSM, UMTS, EDGE, 2G, 2.5G, 3G, 4G, Wimax, WiFi, CDMA 2000, WCDMA, the Bluetooth protocol known in the art, and/or any other wireless protocol); and/or any combination of these and/or other networks.

The system may also include one or more server computers 1602, 1604, 1606 which can be general purpose computers, specialized server computers (including, merely by way of example, PC servers, UNIX servers, mid-range servers, mainframe computers rack-mounted servers, etc.), server farms, server clusters, or any other appropriate arrangement and/or combination. One or more of the servers (e.g., 1606) may be dedicated to running applications, such as a business application, a Web server, application server, etc. Such servers may be used to process requests from user computers 1612, 1614, 1616, 1618. The applications can also include any number of applications for controlling access to resources of the servers 1602, 1604, 1606.

The Web server can be running an operating system including any of those discussed above, as well as any commercially-available server operating systems. The Web server can also run any of a variety of server applications and/or mid-tier applications, including HTTP servers, FTP servers, CGI servers, database servers, Java servers, business applications, and the like. The server(s) also may be one or more computers which can be capable of executing programs or scripts in response to the user computers 1612, 1614, 1616, 1618. As one example, a server may execute one or more Web applications. The Web application may be implemented as one or more scripts or programs written in any programming language, such as Java®, C, C# or C++, and/or any scripting language, such as Perl, Python, or TCL, as well as combinations of any programming/scripting languages. The server(s) may also include database servers, including without limitation those commercially available from Oracle®, Microsoft®, Sybase®, IBM® and the like, which can process requests from database clients running on a user computer 1612, 1614, 1616, 1618.

The system 1600 may also include one or more databases 1620. The database(s) 1620 may reside in a variety of locations. By way of example, a database 1620 may reside on a storage medium local to (and/or resident in) one or more of the computers 1602, 1604, 1606, 1612, 1614, 1616, 1618. Alternatively, it may be remote from any or all of the computers 1602, 1604, 1606, 1612, 1614, 1616, 1618, and/or in communication (e.g., via the network 1610) with one or more of these. In a particular set of embodiments, the database 1620 may reside in a storage-area network ("SAN") familiar to those skilled in the art. Similarly, any necessary files for performing the functions attributed to the computers 1602, 1604, 1606, 1612, 1614, 1616, 1618 may be stored locally on the respective computer and/or remotely, as appropriate. In one set of embodiments, the database 1620 may be a relational database, such as Oracle 10g, that is adapted to store, update, and retrieve data in response to SQL-formatted commands.

Figure 17:
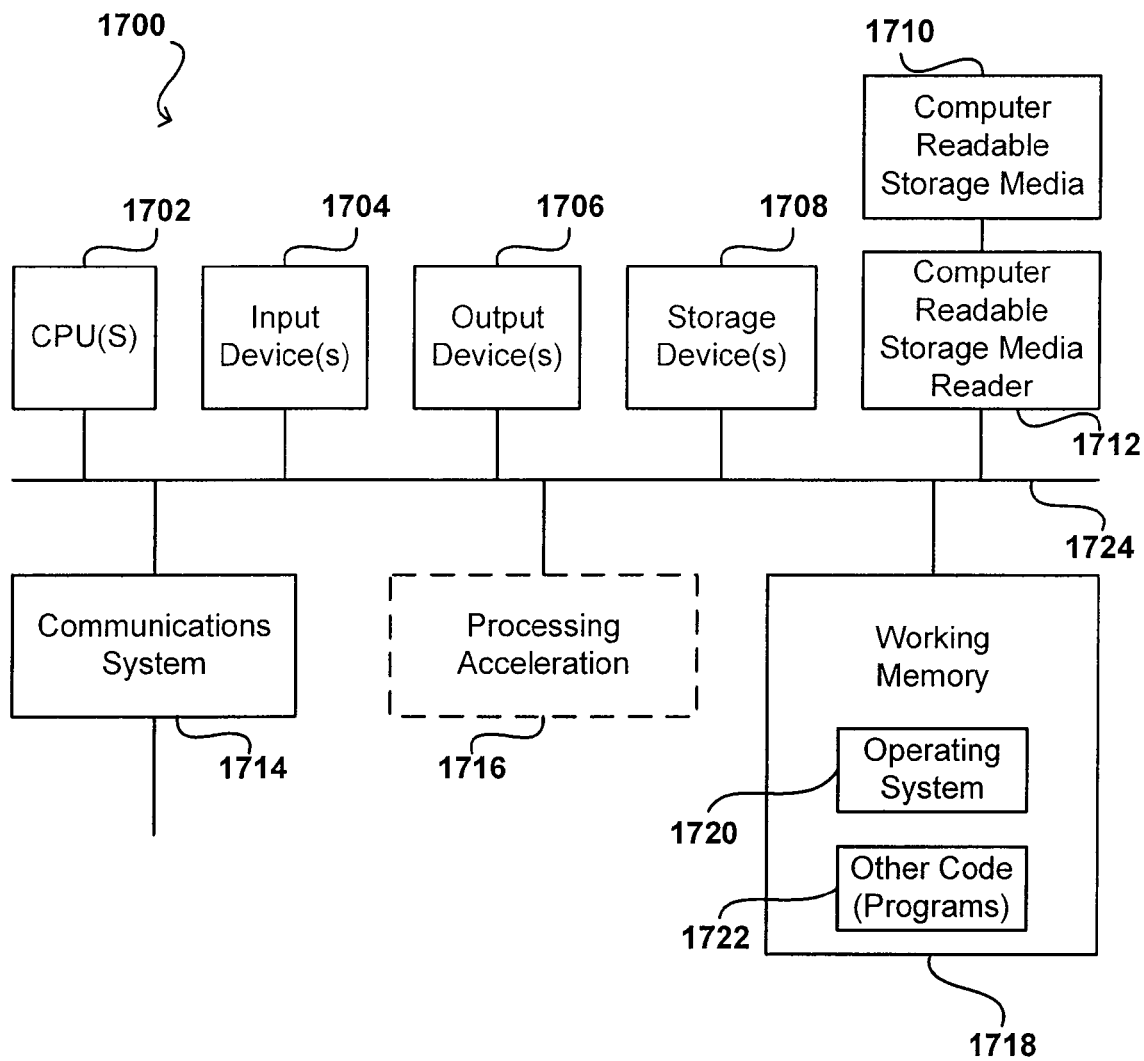
FIG. 17 illustrates components of a computerized device that can be used in accordance with one embodiment of the present invention.

FIG. 17 illustrates an exemplary computer system 1700, in which various embodiments of the present invention may be implemented. The system 1700 may be used to implement any of the computer systems described above. The computer system 1700 is shown comprising hardware elements that may be electrically coupled via a bus 1724. The hardware elements may include one or more central processing units (CPUs) 1702, one or more input devices 1704 (e.g., a mouse, a keyboard, etc.), and one or more output devices 1706 (e.g., a display device, a printer, etc.). The computer system 1700 may also include one or more storage devices 1708. By way of example, the storage device(s) 1708 can include devices such as disk drives, optical storage devices, solid-state storage device such as a random access memory ("RAM") and/or a read-only memory ("ROM"), which can be programmable, flash-updateable and/or the like.

The computer system 1700 may additionally include a computer-readable storage media reader 1712, a communications system 1714 (e.g., a modem, a network card (wireless or wired), an infra-red communication device, etc.), and working memory 1718, which may include RAM and ROM devices as described above. In some embodiments, the computer system 1700 may also include a processing acceleration unit 1716, which can include a digital signal processor DSP, a special-purpose processor, and/or the like.

The computer-readable storage media reader 1712 can further be connected to a computer-readable storage medium 1710, together (and, optionally, in combination with storage device(s) 1708) comprehensively representing remote, local, fixed, and/or removable storage devices plus storage media for temporarily and/or more permanently containing, storing, transmitting, and retrieving computer-readable information. The communications system 1714 may permit data to be exchanged with the network and/or any other computer described above with respect to the system 1700.

The computer system 1700 may also comprise software elements, shown as being currently located within a working memory 1718, including an operating system 1720 and/or other code 1722, such as an application program (which may be a client application, Web browser, mid-tier application, RDBMS, etc.). It should be appreciated that alternate embodiments of a computer system 1700 may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, data signals, data transmissions, or any other medium which can be used to store or transmit the desired information and which can be accessed by the computer. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A method for guaranteeing delivery of event data associated with RFID events, the method comprising:

receiving, at one or more computer systems in communication with one or more RFID tag reading devices, an event object in response to a read transaction initiated with an RFID tag reading device, the event object describing an RFID event captured at the RFID tag reading device;

verifying, with one or more processors associated with the one or more computer systems, whether the event object is committed to a persistent queue before the read transaction is complete;

instructing the RFID tag reading device with the one or more processors associated with the one or more computer systems to release the event object in response to a determination that the event object is committed to the persistent queue;

committing, with the one or more processors associated with the one or more computer systems, the event object before the read transaction is complete to the persistent queue in response to a determination that the event object is not committed to the persistent queue;

requesting, with the one or more processors associated with the one or more computer systems, dimension data for each of one or more attributes of the event object committed to the persistent queue;

correlating, with the one or more processors associated with the one or more computer systems, dimension data requested for each of the one or more attributes of the event object committed to the persistent queue with the one or more attributes of the event object committed to the persistent queue in response to a determination that dimension data is available and storing first correlated event data to a first persistent storage such that queries can be run against the first correlated event data;

verifying, with the one or more processors associated with the one or more computer systems, whether the first correlated event data is committed to the first persistent storage before releasing the event object from the persistent queue;

releasing, with the one or more processors associated with the one or more computer systems, the event object from the persistent queue in response to a determination that the first correlated event data has been committed to the first persistent storage;

committing, with the one or more processors associated with the set of one or more computer systems, the event object to a second persistent storage in response to a determination that dimension data is not available;

requesting, with the one or more processors associated with the one or more computer systems, dimension data for each of one or more attributes of the event object committed to the second persistent storage; and correlating, with the one or more processors associated with the one or more computer systems, dimension data requested for each of the one or more attributes of the event object committed to the second persistent storage in response to a determination that dimension data is available and storing second correlated event data to the first persistent storage such that queries can be run against the second correlated event data.

2. A method according to claim 1, further comprising: generating the event object at the RFID tag reading device in response to capturing the RFID event.

3. A method according to claim 1, further comprising: generating, with the one or more processors associated with the one or more computer systems, information enabling query access to the first correlated event data in the first persistent storage in response to correlating only a portion of the one or more attributes of the event object committed to the persistent queue with the dimension data requested for each of the one or more attributes of the event object committed to the persistent queue.

4. A method according to claim 1, wherein: the persistent queue is a JMS queue.

5. A system for providing guaranteed delivery of RFID event data associated with RFID events, the system comprising:
a processor; and
a memory configured to store instructions executable by the processor to ensure storage of event data associated with RFID events by:
verifying whether an event object received in response to a read transaction initiated with an RFID tag reading device is committed to a persistent queue before the read transaction is complete, the event object describing an RFID event captured at the RFID tag reading device;
instructing the RFID tag reading device to release the event object in response to a determination that the event object is committed to the persistent queue;
committing the event object before the read transaction is complete to the persistent queue in response to a determination that the event object is not committed to the persistent queue;
requesting dimension data for each of one or more attributes of the event object committed to the persistent queue;
correlating dimension data requested for each of the one or more attributes of the event object with the one or more attributes of the event object committed to the persistent queue in response to a determination that dimension data is available and storing first correlated event data to a first persistent storage such that queries can be run against the first correlated event data;
verifying whether the first correlated event data is committed to the first persistent storage before releasing the event object from the persistent queue;
releasing the event object from the persistent queue in response to a determination that the first correlated event data is committed to the first persistent storage;
committing the event object to a second persistent storage in response to a determination that dimension data is not available;
requesting dimension data for each of one or more attributes of the event object committed to the second persistent storage; and
correlating dimension data requested for each of the one or more attributes of the event object with the one or more attributes of the event object committed to the second persistent storage in response to a determination that dimension data is available and storing second correlated event data to the first persistent storage such that queries can be run against the second correlated event data.

6. A system according to claim 5, wherein the RFID tag reading device includes at least one of an antenna, a scanner, and a reader.

7. A system according to claim 5, wherein the first persistent storage or the second persistent storage includes a persistent data repository.

8. A system according to claim 5, wherein a sensor data manager computer includes the first persistent storage or the second persistent storage.

9. A system according to claim 5, wherein the memory includes device drivers able to read into the RFID tag reading device to capture the event object.

10. A computer program product embedded in a non-transitory computer readable medium and including executable instructions for guaranteeing delivery of event data associated with RFID events, the computer program product comprising:
program code for receiving an event object in response to a read transaction with an RFID tag reading device, the event object describing an RFID event captured at the RFID tag reading device;
program code for verifying whether the event object is committed to a persistent queue before the read transaction is complete;
program code for instructing the RFID tag reading device to release the event object in response to a determination that the event object is committed to the persistent queue;
program code for committing the event object before the read transaction is complete to the persistent queue in response to a determination that the event object is not committed to the persistent queue;
program code for requesting dimension data for each of one or more attributes of the event object committed to the persistent queue;
program code for correlating dimension data requested for each of the one or more attributes of the event object committed to the persistent queue in response to a determination that dimension data is available and storing first correlated event data to a first persistent storage such that queries can be run against the first correlated event data;
program code for verifying whether the first correlated event data is committed to first persistent storage before releasing the event object from the persistent queue;
program code for releasing the event object from the persistent queue in response to a determination that the first correlated event data is committed to the first persistent storage; and program code for committing the event object to a second persistent storage in response to a determination that dimension data is not available to be correlated with each of the one or more attributes of the event object;

program code for requesting dimension data for each of one or more attributes of the event object committed to the second persistent storage; and program code for correlating dimension data requested for each of the one or more attributes of the event object committed to the second persistent storage in response to a determination that dimension data is available and storing second correlated event data to the first persistent storage such that queries can be run against the second correlated event data.

11. A computer program product according to claim 10, further comprising:

program code for generating the event object in the RFID tag reading device in response to the RFID event.

12. A computer program product according to claim 10, further comprising:

program code for generating information enabling query access to the first correlated event data in the first persistent storage in response to correlating only a portion of the one or more attributes of the event object committed to the persistent queue with the dimension data requested for each of the one or more attributes of the event object committed to the persistent queue.

13. A computer program product according to claim 10, wherein:

the persistent queue is a JMS queue.

14. A method according to claim 1, further comprising:

generating, with the one or more processors associated with the one or more computer systems, information enabling query access to the second correlated event data in the first persistent storage in response to correlating only a portion of the one or more attributes of the event object committed to the second persistent storage with the dimension data requested for each of the one or more attributes of the event object committed to the second persistent storage.

15. A method according to claim 1, further comprising:

receiving, at the one or more computer systems, master data including dimension data requested for each of the one or more attributes of the event object committed to the persistent queue.

16. A method according to claim 1, further comprising:

receiving, at the one or more computer systems, master data including dimension data requested for each of the one or more attributes of the event object committed to the second persistent storage.

17. A system according to claim 5, the memory is further configured to store instructions executable by the processor to ensure storage of event data associated with RFID events by receiving master data including dimension data requested for each of the one or more attributes of the event object committed to the persistent queue.

18. A system according to claim 5, the memory is further configured to store instructions executable by the processor to ensure storage of event data associated with RFID events by receiving master data including dimension data requested for each of the one or more attributes of the event object committed to the second persistent storage.

19. A computer program product according to claim 10, further comprising:

program code for receiving master data including dimension data requested for each of the one or more attributes of the event object committed to the persistent queue.

20. A computer program product according to claim 10, further comprising:

program code for receiving master data including dimension data requested for each of the one or more attributes of the event object committed to the second persistent storage.

* * * * *